US010887422B2

(12) United States Patent
Scoville et al.

(10) Patent No.: US 10,887,422 B2
(45) Date of Patent: Jan. 5, 2021

(54) SELECTIVELY ENABLING USERS TO ACCESS MEDIA EFFECTS ASSOCIATED WITH EVENTS

(71) Applicant: Facebook, Inc., Menlo Park, CA (US)

(72) Inventors: David Scoville, Edmonds, WA (US); Alyssa Jane Levitz, Seattle, WA (US); Gabe Templeton, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 141 days.

(21) Appl. No.: 15/612,939

(22) Filed: Jun. 2, 2017

(65) Prior Publication Data
US 2018/0348966 A1 Dec. 6, 2018

(51) Int. Cl.
*G06F 40/00* (2020.01)
*H04L 29/08* (2006.01)
(Continued)

(52) U.S. Cl.
CPC ............ *H04L 67/306* (2013.01); *G06F 3/048* (2013.01); *G06F 3/0481* (2013.01); *G06F 40/169* (2020.01); *G06T 11/60* (2013.01); *H04L 51/10* (2013.01); *H04L 51/32* (2013.01); *H04L 65/1089* (2013.01); *H04N 21/4788* (2013.01); *H04N 21/854* (2013.01)

(58) Field of Classification Search
CPC .. G06F 3/048; G06F 3/0481; G06F 17/30017; G06F 17/241; G06F 40/169; G06T 11/60; H04L 51/32; H04L 67/306; H04L 51/10; H04L 65/1089; H04N 21/4788; H04N 21/854

See application file for complete search history.

(56) References Cited

U.S. PATENT DOCUMENTS 7,181,679 B1 * 2/2007 Taylor .................. G06F 40/106
715/234
8,588,974 B2 11/2013 Aoba et al.
(Continued)

OTHER PUBLICATIONS

International Application No. PCT/US2017/028212, "PCT Search Report", dated Nov. 22, 2017, 16 pages.
(Continued)

*Primary Examiner* — William L Bashore
*Assistant Examiner* — David Faber
(74) *Attorney, Agent, or Firm* — Weaver Austin Villeneuve & Sampson LLP

(57) ABSTRACT

The present disclosure describes techniques for enabling users (such as users of a social networking system) to access media effects associated with events. The users may then use the media effects to create media content. For example, a user-selectable option may be provided to a device of a user such that selection of the user-selectable option causes one or more media effects associated with an event to be output by the device. In certain embodiments, techniques are described for selectively providing media effects associated with events to selected users. The selected users may then use the media effects to create media content. For example, a media effect may be associated with one or more conditions for providing the media effect to a user. Only users that satisfy the one or more conditions may get access to the media effect.

19 Claims, 12 Drawing Sheets

(51) Int. Cl.
*H04N 21/854* (2011.01)
*H04N 21/4788* (2011.01)
*H04L 29/06* (2006.01)
*H04L 12/58* (2006.01)
*G06T 11/60* (2006.01)
*G06F 3/0481* (2013.01)
*G06F 40/169* (2020.01)
*G06F 3/048* (2013.01)

(56) References Cited

U.S. PATENT DOCUMENTS

| | | | |
|---|---|---|---|
| 8,639,368 B2 | 1/2014 | Oh et al. | |
| 9,292,840 B1* | 3/2016 | Velline | G06Q 50/01 |
| 9,537,815 B2* | 1/2017 | Farmer, Jr. | H04L 51/32 |
| 9,661,145 B2 | 5/2017 | Gilg et al. | |
| 10,038,757 B2* | 7/2018 | Madiraju | H04L 67/306 |
| 10,123,166 B2* | 11/2018 | Zimerman | H04W 4/021 |
| 2002/0137507 A1* | 9/2002 | Winkler | H04W 88/184 |
| | | | 455/412.1 |
| 2003/0046160 A1* | 3/2003 | Paz-Pujalt | G06Q 10/107 |
| | | | 705/14.69 |
| 2003/0122922 A1* | 7/2003 | Saffer | H04L 29/06027 |
| | | | 348/14.01 |
| 2003/0130907 A1* | 7/2003 | Karas | G06Q 10/101 |
| | | | 705/26.1 |
| 2009/0238538 A1* | 9/2009 | Fink | H04N 5/76 |
| | | | 386/278 |
| 2011/0061108 A1 | 3/2011 | Arrasvuori et al. | |
| 2012/0011450 A1* | 1/2012 | To | G06Q 10/10 |
| | | | 715/752 |
| 2013/0147905 A1 | 6/2013 | Vivekanandan et al. | |
| 2013/0159445 A1* | 6/2013 | Zonka | G06Q 30/06 |
| | | | 709/206 |
| 2013/0238696 A1* | 9/2013 | Cotelo | G06F 16/435 |
| | | | 709/204 |
| 2013/0246524 A1* | 9/2013 | Berner | G06Q 50/01 |
| | | | 709/204 |
| 2013/0254002 A1* | 9/2013 | Isaacson | G06Q 30/0207 |
| | | | 705/14.23 |
| 2013/0332308 A1* | 12/2013 | Linden | G06Q 30/0631 |
| | | | 705/26.7 |
| 2014/0173424 A1* | 6/2014 | Hogeg | H04N 21/4312 |
| | | | 715/255 |
| 2014/0229321 A1 | 8/2014 | Ranganath et al. | |
| 2014/0229552 A1* | 8/2014 | Ranganath | G06Q 50/01 |
| | | | 709/206 |
| 2014/0310335 A1 | 10/2014 | Snibbe et al. | |
| 2015/0040031 A1* | 2/2015 | Lee | G06F 3/04842 |
| | | | 715/748 |
| 2015/0042835 A1* | 2/2015 | Chiu | H04N 5/2621 |
| | | | 348/222.1 |
| 2015/0117839 A1 | 4/2015 | Oberbrunner et al. | |
| 2015/0194185 A1 | 7/2015 | Eronen et al. | |
| 2015/0220558 A1 | 8/2015 | Snibbe et al. | |
| 2016/0063748 A1* | 3/2016 | Kim | G06F 3/04886 |
| | | | 715/778 |
| 2016/0098851 A1* | 4/2016 | Wu | G06T 11/60 |
| | | | 345/634 |
| 2016/0100200 A1 | 4/2016 | Chan et al. | |
| 2016/0180365 A1* | 6/2016 | Shi | G06Q 30/0217 |
| | | | 705/14.19 |
| 2016/0321263 A1* | 11/2016 | Madiraju | G06F 16/2457 |
| 2016/0350953 A1* | 12/2016 | Mittelstaedt | G06T 11/60 |
| 2016/0359777 A1* | 12/2016 | Tucker | H04L 51/16 |
| 2017/0149699 A1* | 5/2017 | Hinson, Jr. | H04L 51/02 |
| 2017/0286366 A1* | 10/2017 | Chang | G06F 40/103 |
| 2017/0336960 A1* | 11/2017 | Chaudhri | G06F 3/04847 |
| 2018/0026925 A1* | 1/2018 | Kennedy | G06K 9/00 |
| | | | 715/753 |
| 2018/0164986 A1* | 6/2018 | Al Majid | G06F 3/04845 |
| 2018/0191797 A1* | 7/2018 | Javier | G06F 40/186 |
| 2018/0241704 A1* | 8/2018 | Al Majid | H04L 51/10 |
| 2018/0300185 A1* | 10/2018 | Smet | G06F 9/451 |

OTHER PUBLICATIONS

U.S. Appl. No. 15/489,715, Final Office Action dated Jan. 18, 2019, 17 pages.

U.S. Appl. No. 15/489,715, Non-Final Office Action dated Jul. 13, 2018, 13 pages.

U.S. Appl. No. 15/489,715, Non-Final Office Action dated Aug. 2, 2019, 15 pages.

U.S. Appl. No. 15/489,715, "Final Office Action", dated Apr. 8, 2020, 15 pages.

* cited by examiner

SELECTIVELY ENABLING USERS TO ACCESS MEDIA EFFECTS ASSOCIATED WITH EVENTS

BACKGROUND

A social networking system may enable its users to interact with and share information with each other through various interfaces provided by the social networking system. To use the social networking system, a user typically has to register with the social networking system. As a result of the registration, the social networking system may create and store information about the user, often referred to as a user profile. The user profile may include the user's identification information, background information, employment information, demographic information, communication channel information, personal interests, or other suitable information. Information stored by the social networking system for a user may be updated based on the user's interactions with the social networking system and other users of the social networking system.

The social networking system may also store information related to the user's interactions and relationships with other entities (e.g., users, groups, posts, pages, events, photos, audiovisual content (e.g., videos), apps, etc.) in the social networking system. The social networking system may store the information in a social graph. The social graph may include nodes representing individuals, groups, entities, organizations, or the like. And the edges between the nodes may represent one or more specific types of interdependencies or interactions between the entities. The social networking system may use this stored information to provide various services (e.g., wall posts, photo sharing, event organization, messaging, games, advertisements, or the like) to its users to facilitate social interaction between users using the social networking system. However, social networking systems are always looking for new services to provide their users to enhance the user experience within the social networking systems.

SUMMARY

The present disclosure describes techniques for enabling users (such as users of a social networking system) to access media effects associated with events. The users may then use the media effects, for example, to create media content that includes the media effects. For example, a user-selectable option related to a media effect associated with an event may be provided to a device of a user such that selection of the user-selectable option by the user enables the user to access the media effect. Selection of the user-selectable option by the user may cause the media effect corresponding to the user-selectable option to be output by the user device.

In certain embodiments, techniques are described for selectively providing media effects associated with events to users. For example, one or more conditions may be associated with a media effect that is associated with an event. The one or more conditions may be related to various criteria, including but not restricted to criteria related to the event, such as the location of the event (e.g., geographical proximity to the event where the event is occurring or is to occur), the time of the event (e.g., temporal proximity to the time of the event), and the like. In some embodiments, a condition may also be based on social networking data stored by a social networking system.

Access to the media effect by a user may be allowed only if the user satisfies the one or more conditions associated with the event. In this manner, only selected users that satisfy the one or more conditions may have access to the media effect. In one illustrative example, a social networking system may determine whether a user has met the one or more conditions associated with a media effect based on information received from the user's device, which may include, for example, location information, time information, and the like.

As indicated above, a media effect may be associated with an event. The media effect may include an audio effect, a visual effect, or a combination thereof. The media effect may modify an audio and/or a visual portion of audiovisual content. Modifying the audiovisual content may include adding, deleting, or modifying the audiovisual content. For example an audio effect may add, delete, or change an audio portion of the audiovisual content. For another example, a visual effect may add, delete, or change a visual portion of the audiovisual content.

In certain embodiments, a media effect may be implemented in the form of a media effect package. The media effect package may include various pieces of information and possibly executable code for implementing the media effect. For example, the media effect package may include art assets (e.g., 3D object descriptions, textures, sprite sheets to be animated, MP4 videos to be played as textures on 3D surfaces, or the like), sound assets (e.g., MP3 files, WAV files, PM4 files, or the like), configuration information (e.g., positioning of 3D elements in a screen space relative to faces or relative to a world around a camera, existence of a face tracker and face mesh, existence of particle effects, text, or layout information describing how text and other assets should display on the screen space), a script (e.g., a JavaScript file) to control outputting the media effect, and the like. The script may, for example, animate the 3D objects and sprite sheets, bind animations and sounds to face gestures, camera motion, or user taps, fetch external data, or create other media effects.

In certain embodiments, the decision whether to enable a user to access a media effect associated with an event may be made when content related to the event is to be communicated to the user. Content related to an event may be, for example, in the form of a web page displaying information related to the event, where the event may be a concert, a movie, a birthday, an anniversary, etc. In this example, the decision whether to enable a user to access a media effect associated with the event may be made, for example, when the web page is to be communicated to a user in response to a web page request received from the user.

As another example, the content related to an event may be in the form of a notification related to the event (e.g., a reminder for a birthday event). In this example, the decision whether to enable a user to access a media effect associated with the event may be made, for example, when a notification related to the event (e.g., a birthday reminder, an announcement of the event) is determined to be sent to the user.

In certain embodiments, in order to enable a user to access a media effect, a user-selectable option is sent to the user's device such that the option when selected by the user enables the user to access and use the media effect. For example, upon determining that a user to whom content related to an event is to be sent satisfies the one or more conditions associated with a media effect associated with the event, in addition to the event-related content, media-effect-related content may be sent to the user's device that causes a user-selectable option (e.g., a button) related to the media effect to be output by a device of the user. In some embodiments, where the media effect is implemented as a media effect package, the media effect package may be sent to the user's device. The user-selectable option may be then output along with the content related to the event by the user's device. For example, a web page displaying information related to the event may include the user-selectable option. As another example, a notification for an event may include the user-selectable option. The user may then select the user-selectable option to access the media effect.

In certain embodiments, upon selecting the user-selectable option, the media effect is output to the user. For example, the media effect is output using the user's device. The media effect may cause a modification to audiovisual content being output by an application (e.g., a camera application) of the device.

In one illustrative example, a user may receive an event notification for an event (e.g., a birthday) and also media-effect-related content that causes a button (for example, with the label "use media effect") to be displayed by the user's device along with the event notification. The button may correspond to a media effect associated with the birthday. The user may then access and use the media effect by selecting the button. For example, selecting the button may cause an application capable of outputting audiovisual information (e.g., a camera application) to be invoked on the user's device and the media effect to be output by the audiovisual application. In certain embodiments, the audiovisual application may be invoked via a deep link from the social networking application. The audiovisual application may execute a script of a media effect package that implements the media effect such that the media effect is output by the user's device. The user may then use the camera application to capture media content (e.g., photos, video) with the media effect included with the captured content.

As another illustrative example, a user may request a public event page for an event (e.g., a concert) provided by a social networking system. The public event page may include a button (for example, with the label "use media effect"). The button may correspond to a media effect associated with the concert. The user may then access and use the media effect by selecting the button. In some examples, the button may be included with the public event page because the user interacted with the public event page, the user is physically at the location of the public event, or the like.

A media effect may be created by a user (referred to as the media effect author). In some embodiments, the media effect author may use one or more editing tools to create a media effect. The media effect author may also associate one or more conditions with the media effect. The media effect may be associated with one or more events. In certain embodiment, the media effect author may be the same user that creates or is responsible for the content related to the event. For example, a particular user of a social networking system may create a web page for an event and also create a media effect for the event.

The present disclosure describes various techniques for enabling users to access media effects associated with events. These techniques include without restriction various methods performed by one or more computing device, various computing systems, non-transitory storage medium storing software (e.g., code, instructions, program) executable by one or more processing units (e.g., processors, cores), and like, and various combinations thereof.

According to certain embodiments, a computing system may determine event-related content to be provided to a user of a social networking system, where the event-related content is associated with an event. The computing system may identify a media effect package created for the event and determine a set of one or more conditions defined for the media effect package. The computing system may then, based on information that is received or stored by the social networking system for the user, determine that the user satisfies the set of one or more conditions. The computing system may then cause the event-related content to be sent to a device associated with the user, and causing a user-selectable option related to the media effect package to be output by the device along with the event-related content, where selection of the user-selectable option causes the device to output one or more effects corresponding to the media effect package, the one or more effects comprising at least one of an audio effect or a visual effect. The event-related content may, for example, be a web page related to the event, a notification related to the event, and the like. In some embodiments, the media effect package may include a script for outputting the one or more effects and the one or more effects may be output when the script is executed by an application that is invoked upon selection of the user-selectable option.

Various different conditions may be included in the set of one or more conditions specified for the media effect package. These conditions may include, for example, a condition related to a time associated with the event, a condition related to a location associated with the event, a condition related to social networking data stored by the social networking system in a user profile, and various other criteria.

In some examples, the media effect package may be created by a particular user of the social networking system. The particular user being different than the user to whom the content is to be provided. In such examples, the set of one or more conditions may include a condition defined by the particular user.

In certain embodiments, a computing system may receive data from a device associated with a user and determine that the user satisfies at least one condition from the set of one or more conditions based on the data received from the device. The data received from the device and which is used to determine if the one or more conditions are satisfied may include, for example, a location of the device, a current time, and the like.

In certain embodiments, a non-transitory computer-readable storage medium storing a plurality of instructions executable by one or more processors is provided, where the plurality of instructions when executed by the one or more processors cause the one or more processors to: determine event-related content to be provided to a user of a social networking system, wherein the event-related content is associated with an event; identify a media effect package created for the event; determine a set of one or more conditions defined for the media effect package; determine, based on information that is received or stored by the social networking system for the user, that the user satisfies the set of one or more conditions; cause the event-related content to be sent to a device associated with the user; and cause a user-selectable option related to the media effect package to be output by the device along with the event-related content, wherein selection of the user-selectable option causes the device to output one or more effects corresponding to the media effect package, the one or more effects comprising at least one of an audio effect or a visual effect.

In certain embodiments, a system is provided comprising one or more processors and a non-transitory computer-readable medium including instructions that, when executed by the one or more processors, cause the one or more processors to determine event-related content to be provided to a user of a social networking system, where the event-related content is associated with an event; identify a media effect package created for the event; determine a set of one or more conditions defined for the media effect package; determine, based on information that is received or stored by the social networking system for the user, that the user satisfies the set of one or more conditions; cause the event-related content to be sent to a device associated with the user; and cause a user-selectable option related to the media effect package to be output by the device along with the event-related content, where selection of the user-selectable option causes the device to output one or more effects corresponding to the media effect package, the one or more effects comprising at least one of an audio effect or a visual effect. The event-related content may, for example, be a web page related to the event or a notification related to the event.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

Figure 1:
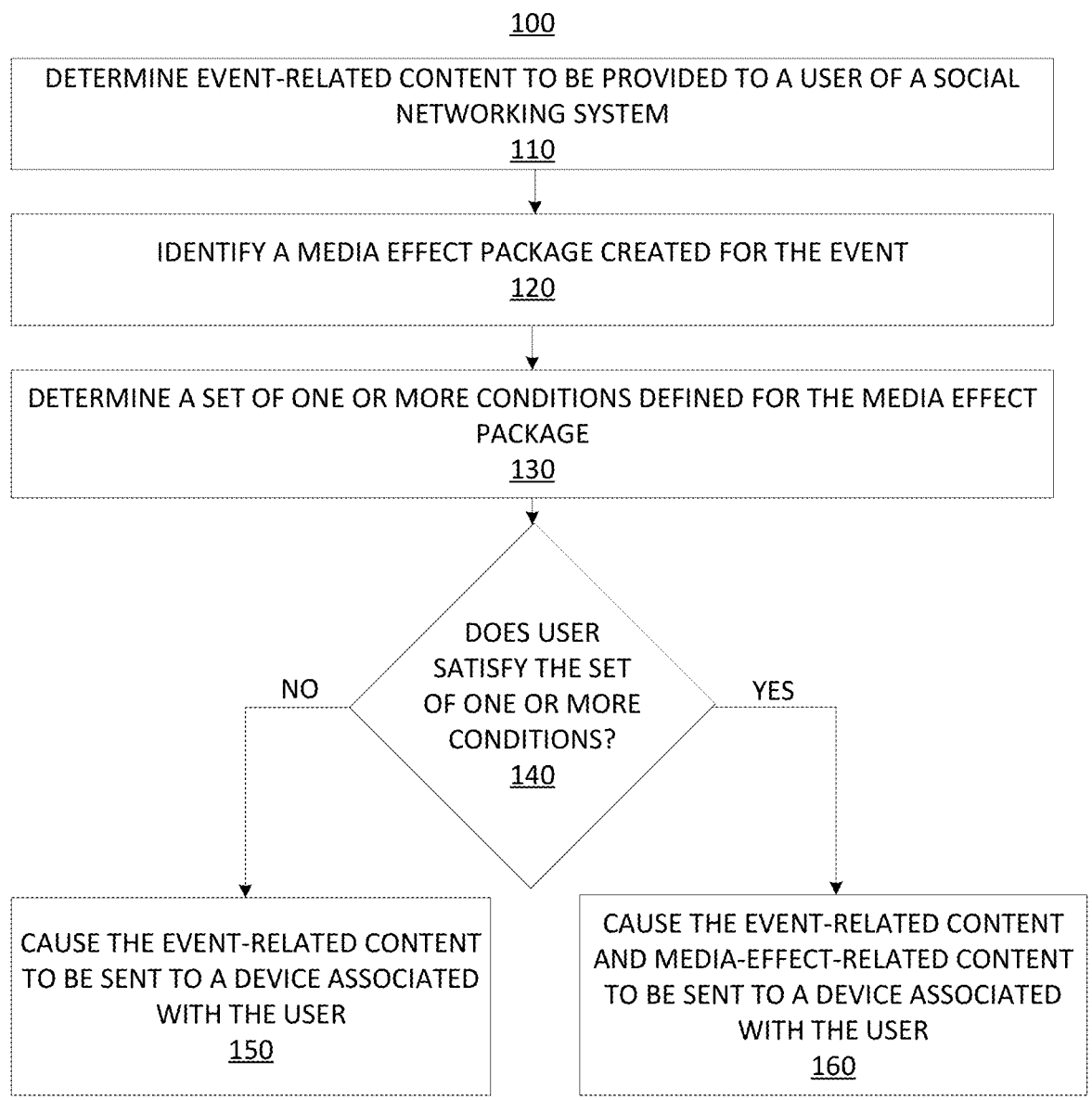
FIG. 1 is a simplified flowchart depicting processing performed by a system such as a social networking system for enabling a user to access a media effect associated with an event.

In the following description, for the purposes of explanation, specific details are set forth in order to provide a thorough understanding of examples of the disclosure. However, it will be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may be shown without necessary detail in order to avoid obscuring the examples. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data.

A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some examples, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The present disclosure describes techniques for enabling users (such as users of a social networking system) to access media effects associated with events. The users may then use the media effects, for example, to create media content that includes the media effects. For example, a user-selectable option related to a media effect associated with an event may be provided to a device of a user such that selection of the user-selectable option by the user enables the user to access the media effect. Selection of the user-selectable option by the user may cause the media effect corresponding to the user-selectable option to be output by the user device.

In certain embodiments, techniques are described for selectively providing media effects associated with events to users. For example, one or more conditions may be associated with a media effect that is associated with an event. The one or more conditions may be related to various criteria, including but not restricted to criteria related to the event, such as the location of the event (e.g., geographical proximity to the event where the event is occurring or is to occur), the time of the event (e.g., temporal proximity to the time of the event), and the like. In some embodiments, a condition may also be based on social networking data stored by a social networking system.

Access to the media effect by a user may be allowed only if the user satisfies the one or more conditions associated with the event. In this manner, only selected users that satisfy the one or more conditions may have access to the media effect. In one illustrative example, a social networking system may determine whether a user has met the one or more conditions associated with a media effect based on information received from the user's device, which may include, for example, location information, time information, and the like.

As indicated above, a media effect may be associated with an event. The media effect may include an audio effect, a visual effect, or a combination thereof. The media effect may modify an audio and/or a visual portion of audiovisual content. Modifying the audiovisual content may include adding, deleting, or modifying the audiovisual content. For example an audio effect may add, delete, or change an audio portion of the audiovisual content. For another example, a visual effect may add, delete, or change a visual portion of the audiovisual content.

In certain embodiments, a media effect may be implemented in the form of a media effect package. The media effect package may include various pieces of information and possibly executable code for implementing the media effect. For example, the media effect package may include art assets (e.g., 3D object descriptions, textures, sprite sheets to be animated, MP4 videos to be played as textures on 3D surfaces, or the like), sound assets (e.g., MP3 files, WAV files, PM4 files, or the like), configuration information (e.g., positioning of 3D elements in a screen space relative to faces or relative to a world around a camera, existence of a face tracker and face mesh, existence of particle effects, text, or layout information describing how text and other assets should display on the screen space), a script (e.g., a JavaScript file) to control outputting the media effect, and the like. The script may, for example, animate the 3D objects and sprite sheets, bind animations and sounds to face gestures, camera motion, or user taps, fetch external data, or create other media effects.

In certain embodiments, the decision whether to enable a user to access a media effect associated with an event may be made when content related to the event is to be communicated to the user. Content related to an event may be, for example, in the form of a web page displaying information related to the event, where the event may be a concert, a movie, a birthday, an anniversary, etc. In this example, the decision whether to enable a user to access a media effect associated with the event may be made, for example, when the web page is to be communicated to a user in response to a web page request received from the user.

As another example, the content related to an event may be in the form of a notification related to the event (e.g., a reminder for a birthday event). In this example, the decision whether to enable a user to access a media effect associated with the event may be made, for example, when a notification related to the event (e.g., a birthday reminder, an announcement of the event) is determined to be sent to the user.

In certain embodiments, in order to enable a user to access a media effect, a user-selectable option is sent to the user's device such that the option when selected by the user enables the user to access and use the media effect. For example, upon determining that a user to whom content related to an event is to be sent satisfies the one or more conditions associated with a media effect associated with the event, in addition to the event-related content, media-effect-related content may be sent to the user's device that causes a user-selectable option (e.g., a button) related to the media effect to be output by a device of the user. In some embodiments, where the media effect is implemented as a media effect package, the media effect package may be sent to the user's device. The user-selectable option may be then output along with the content related to the event by the user's device. For example, a web page displaying information related to the event may include the user-selectable option. As another example, a notification for an event may include the user-selectable option. The user may then select the user-selectable option to access the media effect.

In certain embodiments, upon selecting the user-selectable option, the media effect is output to the user. For example, the media effect is output using the user's device. The media effect may cause a modification to audiovisual content being output by an application (e.g., a camera application) of the device.

In one illustrative example, a user may receive an event notification for an event (e.g., a birthday) and also media-effect-related content that causes a button (for example, with the label "use media effect") to be displayed by the user's device along with the event notification. The button may correspond to a media effect associated with the birthday. The user may then access and use the media effect by selecting the button. For example, selecting the button may cause an application capable of outputting audiovisual information (e.g., a camera application) to be invoked on the user's device and the media effect to be output by the audiovisual application. In certain embodiments, the audiovisual application may be invoked via a deep link from the social networking application. The audiovisual application may execute a script of a media effect package that implements the media effect such that the media effect is output by the user's device. The user may then use the camera application to capture media content (e.g., photos, video) with the media effect included with the captured content.

As another illustrative example, a user may request a public event page for an event (e.g., a concert) provided by a social networking system. The public event page may include a button (for example, with the label "use media effect"). The button may correspond to a media effect associated with the concert. The user may then access and use the media effect by selecting the button. In some examples, the button may be included with the public event page because the user interacted with the public event page, the user is physically at the location of the public event, or the like.

A media effect may be created by a user (referred to as the media effect author). In some embodiments, the media effect author may use one or more editing tools to create a media effect. The media effect author may also associate one or more conditions with the media effect. The media effect may be associated with one or more events. In certain embodiment, the media effect author may be the same user that creates or is responsible for the content related to the event. For example, a particular user of a social networking system may create a web page for an event and also create a media effect for the event.

A media effect may be created by a user (referred to as the media effect author). In some embodiments, the media effect author may use one or more editing tools to create a media effect. The media effect author may also associate one or more conditions with the media effect. The media effect may be associated with one or more events. In certain embodiment, the media effect author may be the same user that creates or is responsible for the content related to the event. For example, a particular user of a social networking system may create a web page for an event and also create a media effect for the event.

In certain embodiments, an infrastructure may be provided that enables users to access and use media effects associated with one or more events. For example, a social networking system may enable users, such as users of a social networking system, to access and use media effects associated with events. In some embodiments, the social networking system may include an event engine that is configured to selectively provide media effects associated with events to one or more selected users. While several embodiments are described below, it should be recognized that any combination of the embodiments may be used, and these embodiments are not intended to be restrictive in any way.

FIG. 1 is a simplified flowchart 100 depicting processing performed by a system such as a social networking system for enabling a user to access a media effect associated with an event according to certain embodiments. In some examples, the flowchart 100 may be performed by an event engine of the social networking system. The processing depicted in FIG. 1 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 1 and described below is intended to be illustrative and non-limiting. The particular series of processing steps depicted in FIG. 1 is not intended to be limiting. While FIG. 1 is described as being performed by a social networking system, this is not intended to be limiting. The processing depicted in FIG. 1 may be performed by other computing systems.

In the embodiment depicted in FIG. 1, the processing may be triggered at 110, when the social networking system determines that event-related content is to be provided to a user of the social networking system. The event-related content may correspond to any content that is related to an event. For example, the event-related content may be a web page displaying information related to the event (where the event may be a concert, a movie, a birthday, an anniversary, etc.), a notification related to the event (e.g., a reminder for a birthday event), and the like.

For example, the social networking system may receive a request from the user for a web page related to the event and processing depicted in FIG. 1 may then be triggered in response to receiving the web page request. For example, the user may navigate to a universal resource locator (URL) associated with the page, where the page is associated with an event and may include information related to the event such as a time and/or a location of the event. In certain embodiments, the even-related content may be content provided by the social networking system.

As another example, the event-related content may be a notification related to an event to be sent to a user and processing depicted in FIG. 1 may then be triggered when the social networking system determined that the notification is to be sent. For example, the social networking system may identify that a friend of the user has an upcoming birthday and a notification is to be sent to the user reminding the user of the upcoming birthday. Other notifications may include an upcoming event that the user expressed interest for, notifications requested to be sent to the user, or any other message that may be generated by either a user of the social networking system or the social networking system itself.

At 120, the social networking system may identify a media effect package implementing a media effect associated with the event. The media effect package may include art assets (e.g., 3D object descriptions, textures, sprite sheets to be animated, MP4 videos to be played as textures on 3D surfaces, or the like), sound assets (e.g., MP3 files, WAV files, PM4 files, or the like), configuration information (e.g., positioning of 3D elements in a screen space relative to faces or relative to a world around a camera, existence of a face tracker and face mesh, existence of particle effects, text, or layout information describing how text and other assets should display on the screen space), a script (e.g., a JavaScript file) to instruct how a device should output one or more media effects (e.g., an audio effect, a visual effect, or any combination) implemented by the media effect package. The script may also animate the 3D objects and sprite sheets, bind animations and sounds to face gestures, camera motion, or user taps, fetch external data, or the like.

At 130, the social networking system may determine a set of one or more conditions defined or specified for the media effect implemented by the media effect package. The set of one or more conditions may be used for selectively identifying users that may access and use the media effect implemented by the media effect package.

In certain embodiments, the set of one or more conditions may be set by an author or creator of the media effect package when the media effect package is created. The conditions may be related to various criteria, including but not restricted to criteria related to the event, such as the location of the event (e.g., geographical proximity to the event where the event is occurring or is to occur), the time of the event (e.g., temporal proximity to the time of the event), and the like. In some embodiments, a condition may also be based on social networking data stored by a social networking system.

In some embodiments, a condition may be automatically associated with a media effect package. For example, a condition may be automatically associated with the media effect package based on a context associated with the event for which the media effect implemented by the media effect package is created. For example, the social networking system may automatically set a condition associated with a time period associated with the event (e.g., time when the event is to occur). In some examples, the set of one or more conditions may allow the media effect package to be made available to the user during the event and/or when the user is interested in or going to the event, at the location of the event, or the like.

At 140, the social networking system may determine whether the user to whom the event-related content is to be sent satisfies the set of one or more conditions. Various different user-related data may be used to determine whether the user satisfies the one or more conditions. As one example, data received from the device of the user may be used to determine whether the user satisfies the one or more conditions. For example, the data received from the user's device may include location information for the device (e.g., GPS information). In such an example, if a condition associated with the media effect is based on geographical information (e.g., proximity to where the event is occurring or is to occur), the geographical information may be used to determine if the condition is met. As another example, data received from the user's device may include a time. In such an example, if a condition associated with the media effect is based on time (e.g., proximity to when the event is occurring or is to occur), the time may be used to determine if the condition is met. As yet another example, the data received from the user's device may include data generated by one or more sensors or components on the user's device. For example, the data may include accelerometer data generated by an accelerometer of the device, a temperature reading sensed by a temperature sensor on the device, altimeter data generated by an altimeter on the user device, and the like. If the conditions associated with the media effect package are based on any of these criteria, then the data received from the user's device may be used to determine whether the user satisfies the one or more conditions specified for the media effect package.

As another example, data received and/or stored by the social networking system for the user may be used to determine whether the user satisfies the set of one or more conditions. For example, a social networking system typically stores information for its users in the form of user profiles. In one embodiment, the social networking system may access the particular user's profile and, based on information in the particular user's profile, determine whether the user satisfies the set of one or more conditions.

In some examples, the data used by the social networking system to determine if the one or more conditions are satisfied by the user may be received by the social networking system from a third-party server. The third-party server may send the data to the social networking system in response to a request from the user or the social networking system itself. For example, the user may send an identification of a location to the social networking system. The social networking system may then use the identification of the location to send a request for a temperature at the location from a third-party weather server. The third-party weather server may then send the requested temperature data to the social networking system. The social networking system may then use this data received from the third-party weather server to determine whether the user satisfies the one or more conditions.

While certain examples of data that may be used to determine whether the user satisfies the one or more conditions are described above, these are not intended to be limiting. Various other data and various combinations of the data may be used. The social networking system determines the data to be used based on the one or more conditions associated with the media effect package.

If the user satisfies the set of one or more conditions, the processing may proceed to 160, where the event-related content and media effect-related content is caused to be sent to a device associated with the user, where the media effect-related content causes a user-selectable option to be displayed on the user's device. The user-selectable option, when selected by the user, enables the user to access and use the media effect implemented by the media effect package.

If the user does not satisfy the set of one or more conditions, the processing may proceed to 150, where the social networking system may cause the event-related content to be sent to a device associated with the user. For example, if the event-related content is a web page, the web page may be communicated from the social networking system to the user's device. If the event-related content is a notification, the notification may be sent to the user's device.

If the user satisfies the set of one or more conditions, the processing may proceed to 160, where, in addition to the event-related content, media effect-related content is also communicated to the user' device, where the media effect-related content causes a user-selectable option (e.g., a button) to be displayed on the user's device. The user-selectable option, when selected by the user, enables the user to access and use the media effect implemented by the media effect package. In certain embodiments, the user-selectable option related to the media effect package may be output by the device along with the event-related content. The user-selectable option may be added with the event-related content by the social networking system before the event-related content is sent to the device.

In some examples, as part of 160, the media effect package is communicated from the social networking system to the user's device. The media effect package may include a script which when executed by the user's device causes a media effect implemented by the media effect package to be output by the user's device. The media effect may include an audio effect, a visual effect, or a combination thereof. In other examples, the media effect package may be communicated from the social networking system to the user's device when the user-selectable button is selected by the user.

In certain embodiments, when the user selects the user-selectable option displayed by the user's device, the media effect is output to the user. For example, the media effect may be output using the user's device. In certain embodiments, selecting the user-selectable option (e.g., selecting a button) may cause an application capable of outputting audiovisual information (e.g., a camera application) to be invoked on the user's device and the media effect is output by the audiovisual application. In certain embodiments, the audiovisual application may be invoked via a deep link to the application. The audiovisual application may execute one or more contents of the media effect package that implements the media effect such that the media effect is output by the user's device. The user may then use the camera application to capture media content (e.g., photos, video) with the media effect added to the captured content.

In some examples, when various users have used the media effect package to produce (and/or store) modified audiovisual content, a conglomeration of the modified audiovisual content from the various users may be generated for the event. For example, the modified audiovisual content from the various users may be collected to be presented to one or more users.

Figure 2:
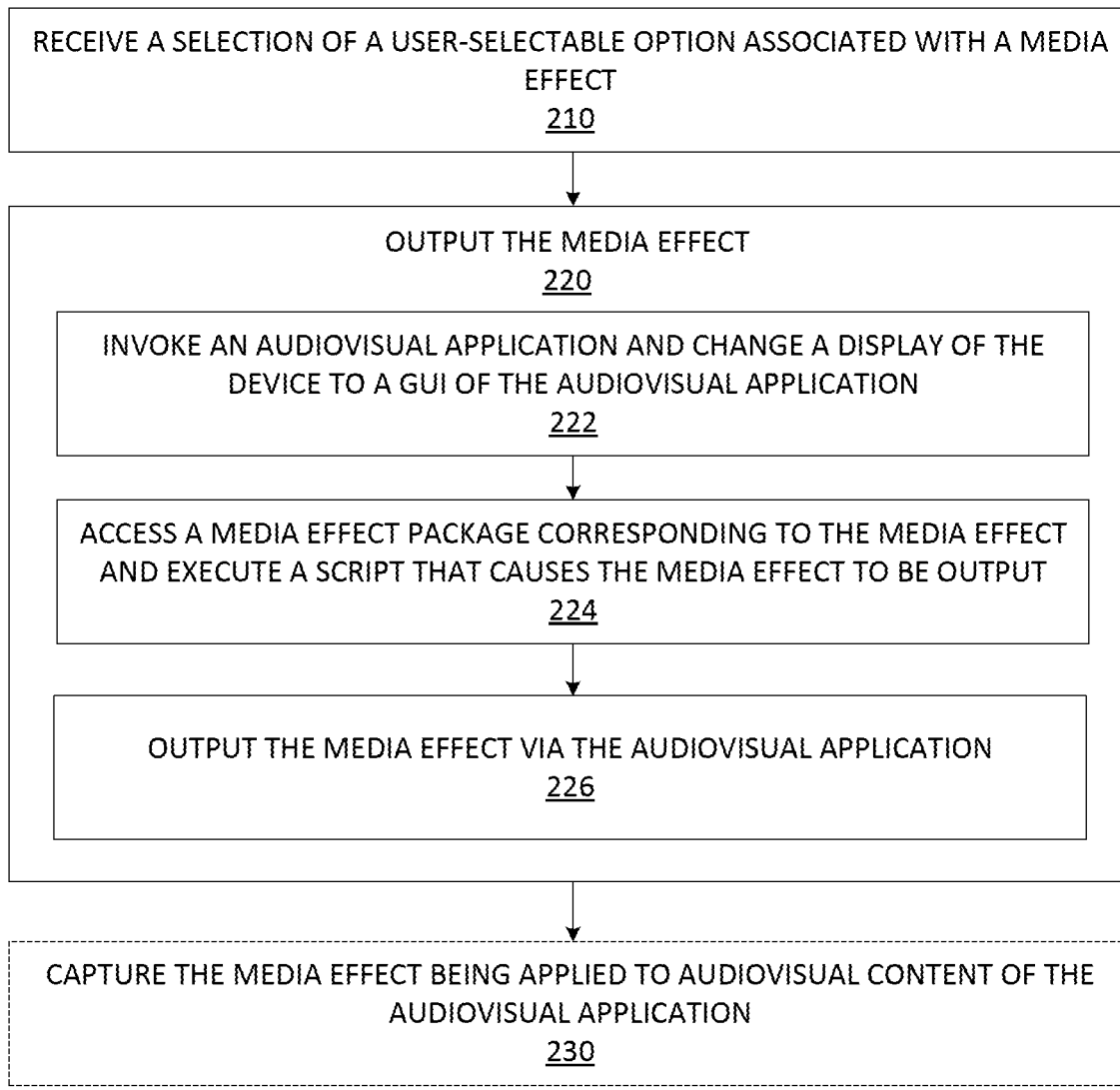
FIG. 2 is a simplified flowchart depicting processing performed by a user device for outputting a media effect.

FIG. 2 is a simplified flowchart depicting processing performed by a user device for outputting a media effect according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. The particular series of processing steps depicted in FIG. 2 is not intended to be limiting.

At 210, a device may receive a signal that a user-selectable option associated with a media effect has been selected. As previously described, the user-selectable option may be displayed by the device possibly along with event-related content. The selection may cause a display of the device to change from a user interface of a social networking application to a user interface of a camera application. The camera application may output audiovisual content received from an audiovisual information capture subsystem (e.g., one or more cameras, one or more microphones, or the like) of the device. The camera application may also output audiovisual content stored by the device.

At 220, the device may output the media effect. Outputting the media effect may include, at 222, invoking an audiovisual application and changing a display of the device to a graphical user interface (GUI) of the audiovisual application.

At 224, outputting the media effect may further include accessing a media effect package corresponding to the media effect and executing a script of the media effect package to cause the media effect to be output by the device. In some examples, the media effect package may be already on the device due to it being communicated from the social networking system to the device in 160 of FIG. 1. In other examples, the device may send a request to the social networking system for the media effect package after receiving the selection of the user-selectable option. The media effect package may then be sent to the device by the social networking system.

At 226, outputting the media effect may be performed via the audiovisual application. The media effect may be applied to, mixed with, or added to audiovisual content captured by one or more components (e.g., a camera, a microphone, or the like) of the device. For example, the audiovisual content may be modified according to the media effect, and the modified content may be output via the GUI of the audiovisual application. The media effect may be an audio effect and/or a visual effect. The audio effect may modify an audio portion of the audiovisual content. Modifying the audio portion may include adding audio to the audio portion, mixing audio with the audio portion, removing at least some of the audio portion, or changing how the audio portion sounds. The visual effect may modify a visual portion of the audiovisual content. Modifying the visual portion may include adding a visual element to the visual portion, removing a visual element of the visual portion, or changing a visual element of the visual portion.

At 230, the user may cause the media effect to be captured. For example, while the media effect is being applied to audiovisual content of the audiovisual application, at least a portion of the audiovisual content that is modified based on the media effect may be stored. The modified audiovisual content that is captured may be a picture, a video, or an audio portion. The dotted lines around 230 indicates that it may be optional.

Figure 3A:
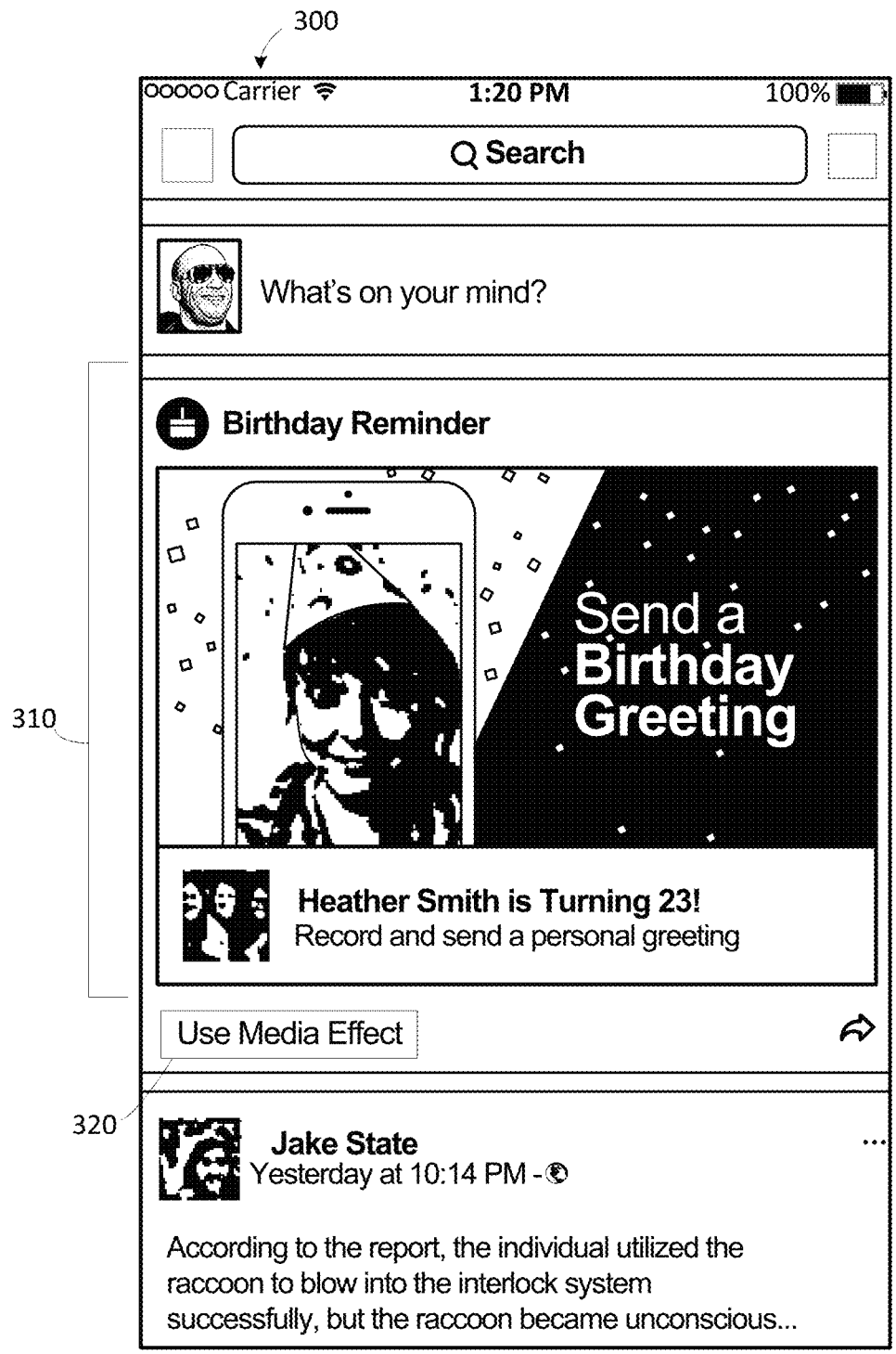
FIG. 3A depicts an example graphical user interface (GUI) for a social networking application that may be displayed on a device used by a user for interacting with the social networking system.
Figure 3B:
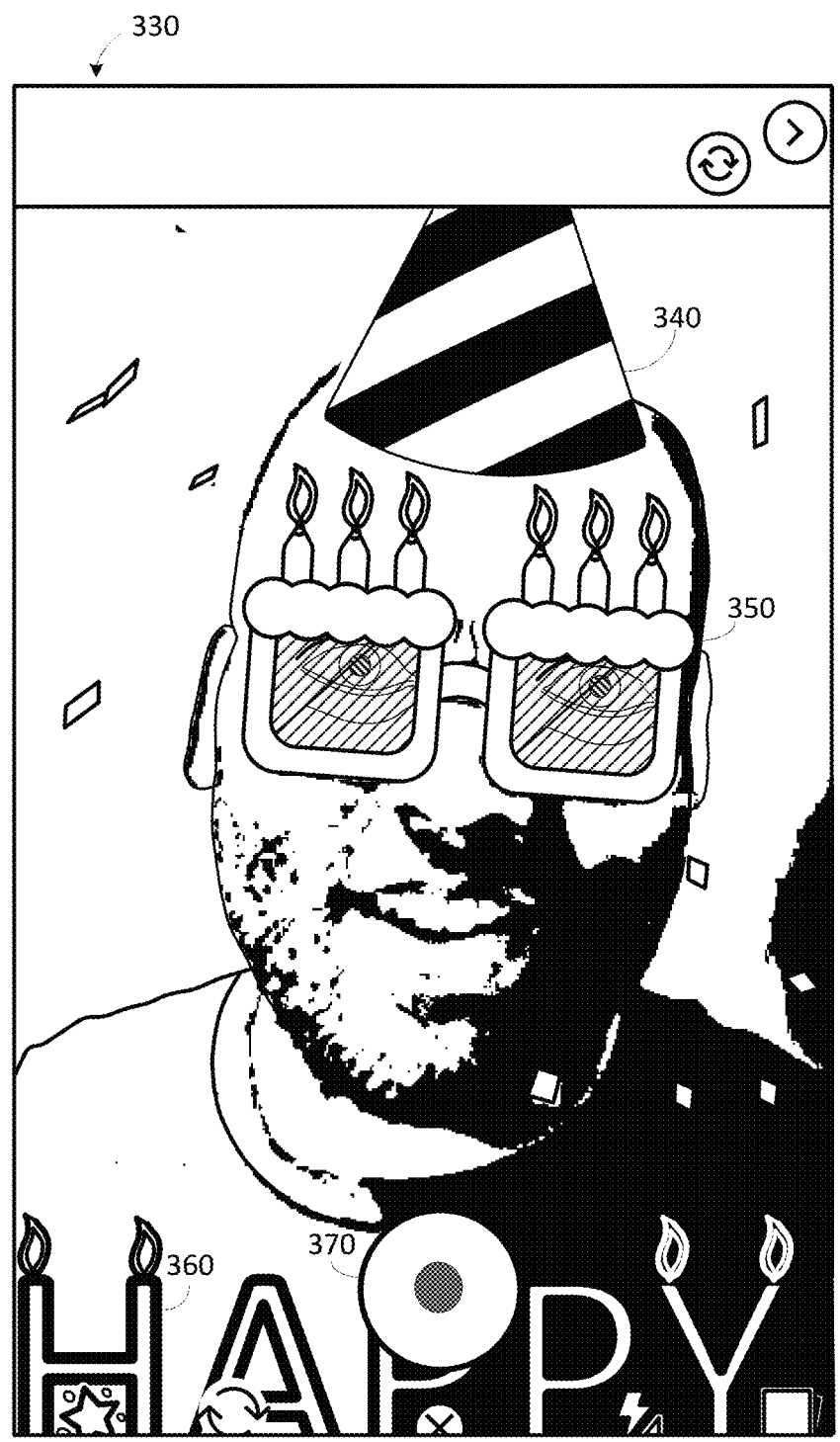
FIG. 3B depicts an example graphical user interface (GUI) for a camera application that may be displayed on a device used by a user.

FIGS. 3A and 3B depict examples of graphical user interfaces (GUIs) associated with outputting a media effect according to certain embodiments. The examples depicted in FIGS. 3A and 3B assume that the event-related content is a notification for a birthday.

FIG. 3A depicts an example GUI 300 for a social networking application that may be displayed on a device used by a user for interacting with the social networking system. As shown, GUI 300 displays a birthday reminder notification 310 for a friend "Heather Smith" of the user. Notification 310 indicates that Heather Smith is turning 23 years old. Along with the notification, a user-selectable media effect button 320 (e.g., "Use Media Effect") is displayed. While this example illustrates one type of notification, it should be recognized that other types of notifications may be used, such as an email, a pushed notification, or other message that may include information associated with an event.

The user may select button 320 to access the media effect associated with the notification (and to possibly use the media effect). For example, selection of media effect button 320 by the user may cause the social networking application to switch to a camera application, which may then execute a script included in the media effect package (corresponding to the media effect) that causes the one or more media effects to be output by the camera application. As one example, selection of media effect button 320 may cause the camera application to be invoked and the device to switch its display from GUI 300 in FIG. 3A to GUI 330 in FIG. 3B.

As shown in FIG. 3B, audiovisual content may be output by an audiovisual application. The audiovisual content may be stored by the device and/or captured by a camera of the device. For example, the audiovisual content may include the person illustrated in FIG. 3B. In addition to the person, one or more media effects may be applied to the audiovisual content. The one or more media effects may modify the audiovisual content. For example, a media effect may include placing hat 340 on the person's head, placing glasses 350 over the eyes of the person, and/or inserting text 360 at the bottom of the audiovisual content. The camera application may also include capture button 370, which may allow a user to store modified media content. The modified media content may be an image, a video, or an audio segment of the audiovisual content while being modified by the one or more media effects.

Figure 4A:
FIG. 4A depicts another example graphical user interface (GUI) for a social networking application that may be displayed on a device.
Figure 4B:
FIG. 4B depicts another example graphical user interface (GUI) for a camera application that may be displayed on a device used by a user.

FIGS. 4A-4B depicts other examples of GUIs associated with outputting a media effect according to certain embodiments. The examples depicted in FIGS. 4A and 4B assume that the event-related content is a page for a beach party event.

FIG. 4A depicts an example GUI 400 for a social networking application that may be displayed on a device. GUI 400 includes time 410 for the beach party event, location 420 for the beach party event, and media effect button 430

(e.g., "Use Media Effect"). Media effect button 430 may cause the social networking application to switch to a camera application, where a script of a media effect package (corresponding to the media effect) may be executed. It should be recognized that other content may be included on the page, such as the description illustrated below location 420.

Selection of media effect button 430 may cause the camera application to be invoked and its GUI 440 to be displayed on the device, as illustrated in FIG. 4B. The text included in text box 450 may be the media effect. Similar to FIG. 3B above, GUI 440 of the camera application may also include a capture button, which may allow a user to store modified media content. The modified media content may be an image, a video, or an audio segment of the audiovisual content while being modified by the one or more media effects.

Figure 5A:
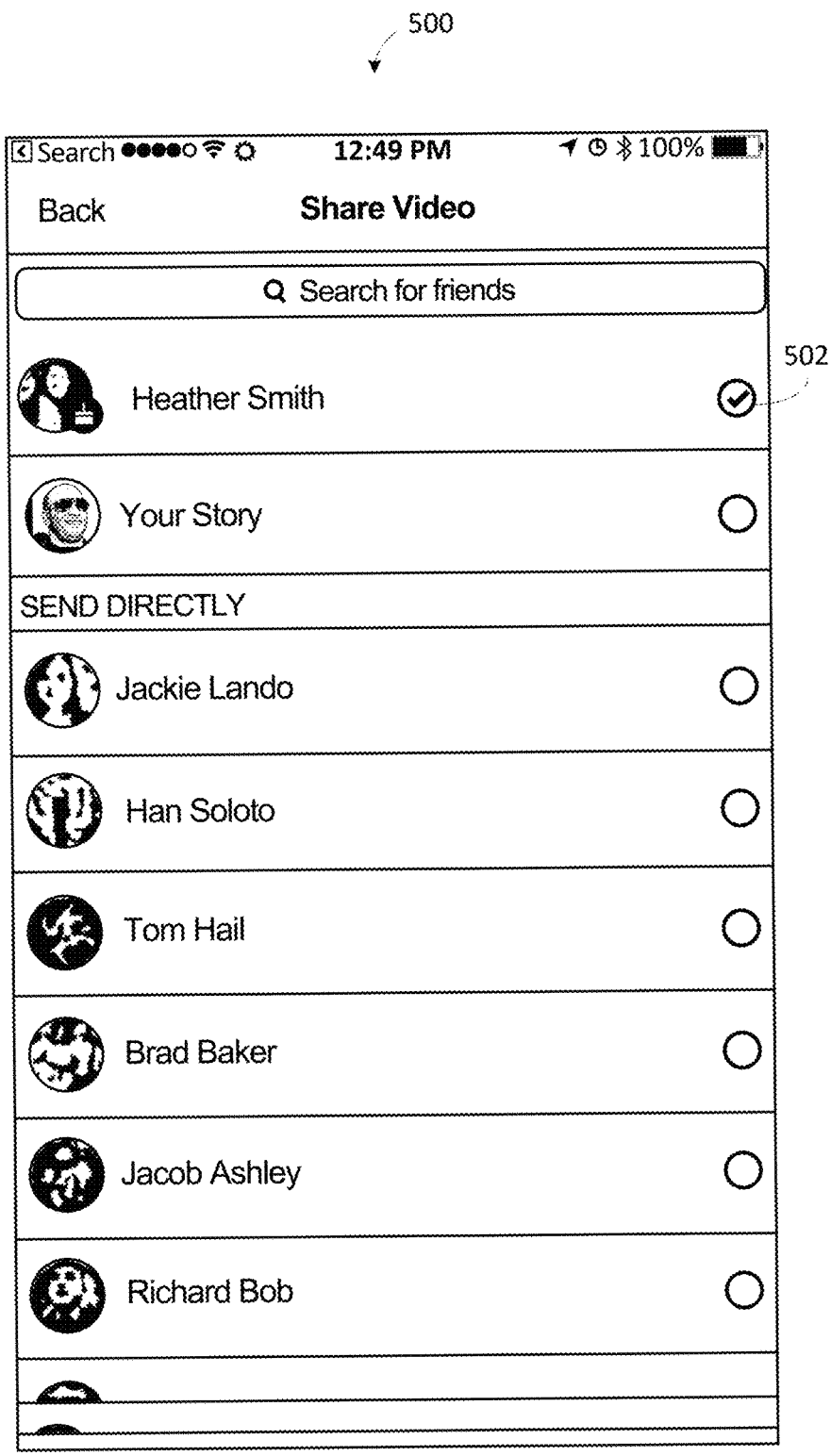
FIG. 5A depicts a graphical user interface (GUI) for sharing the media content.
Figure 5B:
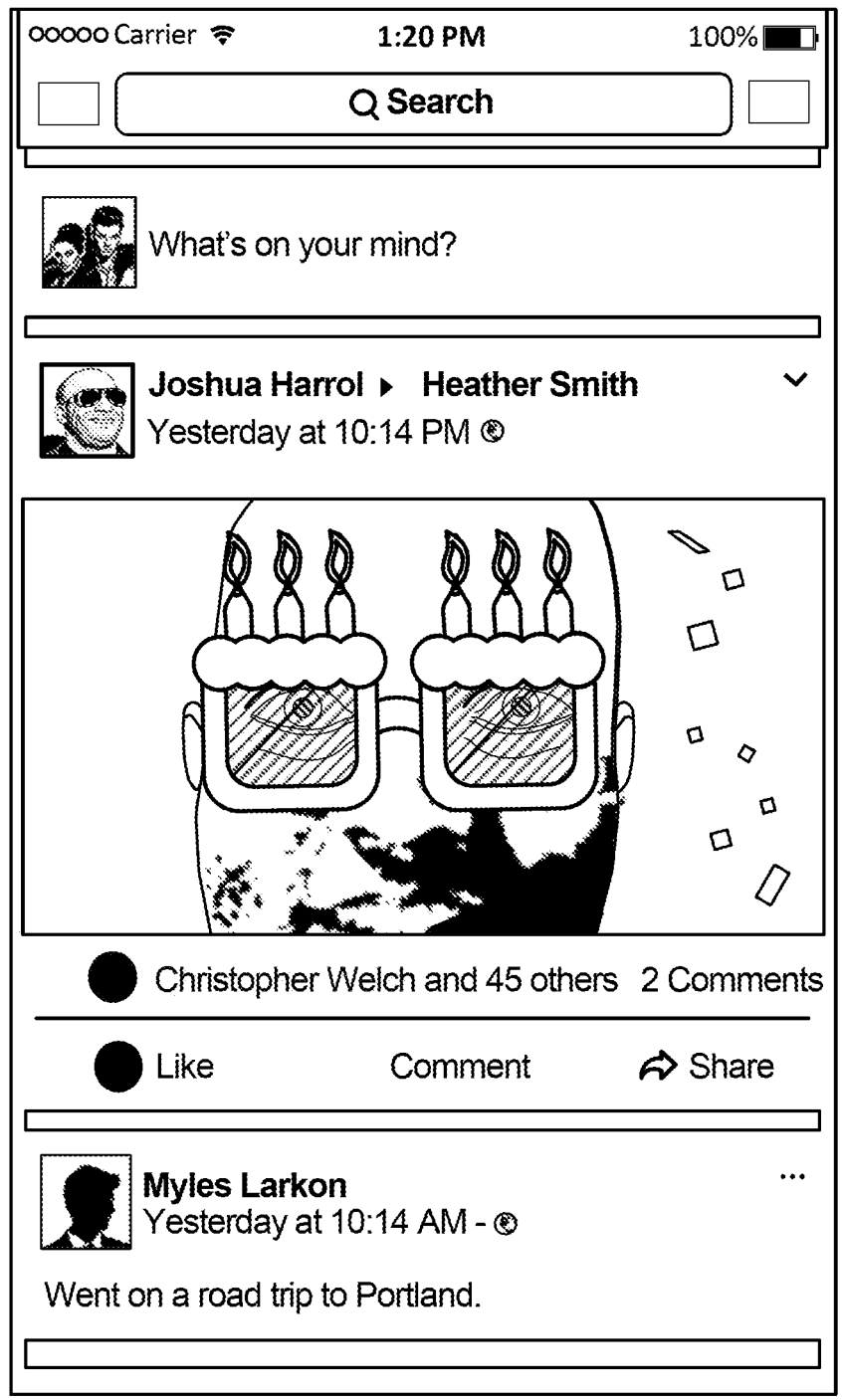
FIG. 5B depicts a graphical user interface (GUI) for a social networking application sharing media content.

FIGS. 5A-5B depict examples of GUIs for sharing media content (e.g., modified audiovisual content described above) that may have been created using a media effect. In particular, FIG. 5A depicts a GUI 500 for sharing the media content. GUI 500 may be provided by the social networking application or by the audiovisual application. GUI 500 may allow a user to select the media content that has been previously captured using the media effect and to select one or more users with whom the content is to be shared.

After an indication to share the media content with one or more users is made (in FIG. 5A, a single user Heather Smith has been selected as indicated by selection 502), the media content may be sent to the one or more users (as illustrated in FIG. 5B). In certain embodiments, the media content may be placed on a wall of Heather Smith such that Heather Smith (and other users based on privacy settings for Heather Smith) may see the media content. Various other techniques may be use for sending the content to selected users.

Figure 6:
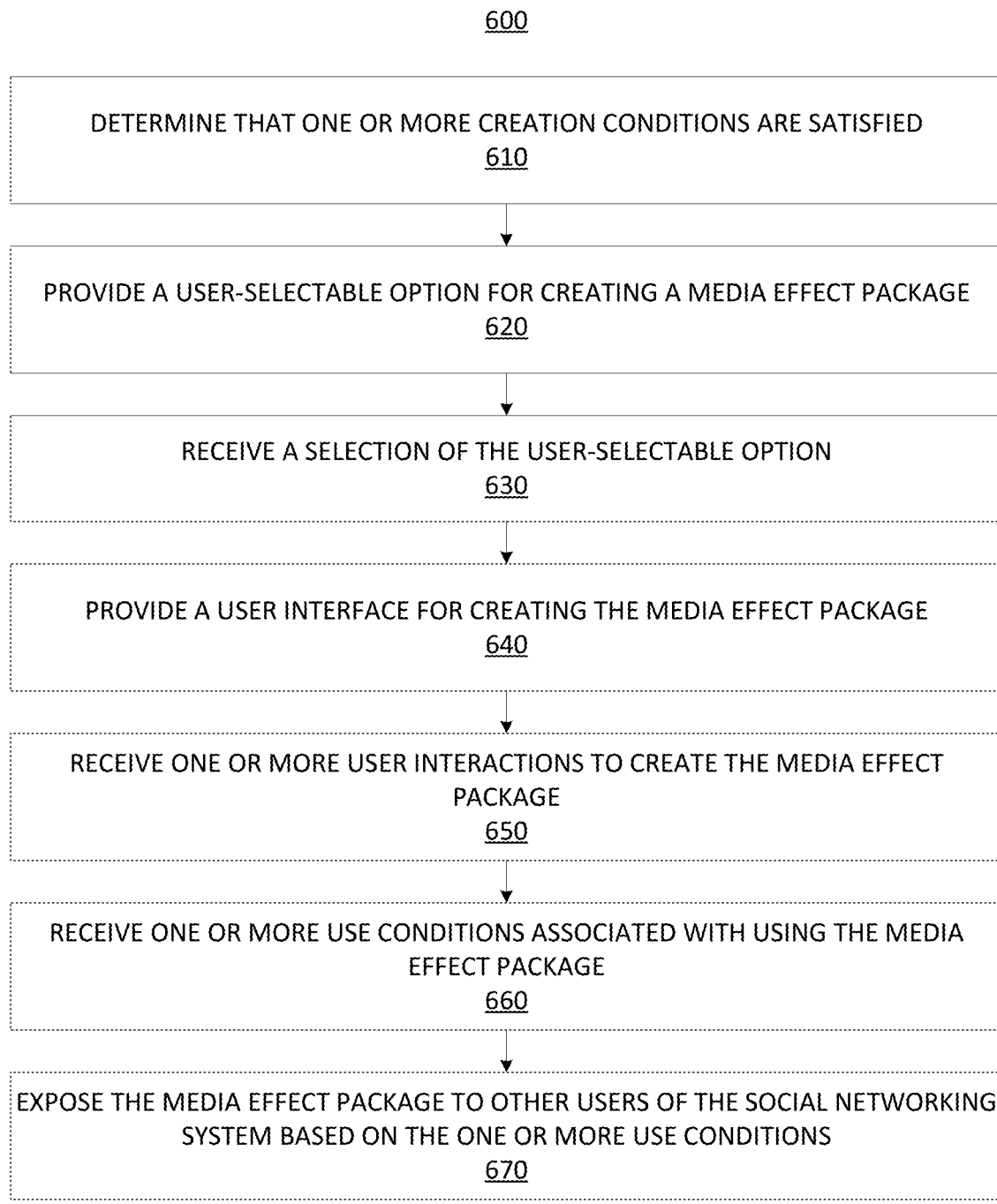
FIG. 6 is a simplified flowchart depicting processing performed by a social networking system for creating a media effect.

FIG. 6 is a simplified flowchart 600 depicting processing performed by a social networking system for creating a media effect according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. The particular series of processing steps depicted in FIG. 6 is not intended to be limiting. While FIG. 6 is described as being performed by a social networking system, this is not intended to be limiting. The processing depicted in FIG. 1 may be performed by other computing systems.

At 610, it may be determined whether one or more creation conditions are satisfied by a user of the social networking system. The one or more creation conditions may indicate when a user may create a media effect for an event. The one or more creations conditions may be specified by the social networking system and/or a user that is creating the event on the social networking system. In some examples, the user that creates the media effect for the event may be different than the user that creates the event.

At 620, a user-selectable option for creating a media effect package may be provided to the user. At 630, an indication of a selection of the user-selectable option may be received by the device. At 640, a user interface for creating the media effect package may be provided by the device.

At 650, one or more user interactions may be received by the device. The one or more user interactions may be to create the media effect package. For example, the one or more interactions may include instructions (e.g., code) that would be executed to output one or more effects (e.g., an audio effect, a visual effect, or a combination thereof). However, in some examples, the instructions may be automatically generated once a user indicates one or more previously-created media effects that should be included in the media effect package. In such examples, the one or more user interactions may include formatting one or more visual elements to be provided when the media effect package is executed. In other examples, a media effect package created for a different event may be associated with the event. This allows the media effect package to be reused for different events.

At 660, one or more use conditions (as described in FIG. 1 when referring to one or more conditions) may be received from the user and/or the social networking system for the media effect package. The one or more use conditions may be associated with using the media effect package.

At 670, the media effect package may be exposed to other users of the social networking system based on the one or more use conditions. In particular, the media effect package may be provided to a particular user of the social networking system when the particular user satisfies the one or more use conditions (as described in FIG. 1).

Figure 7:
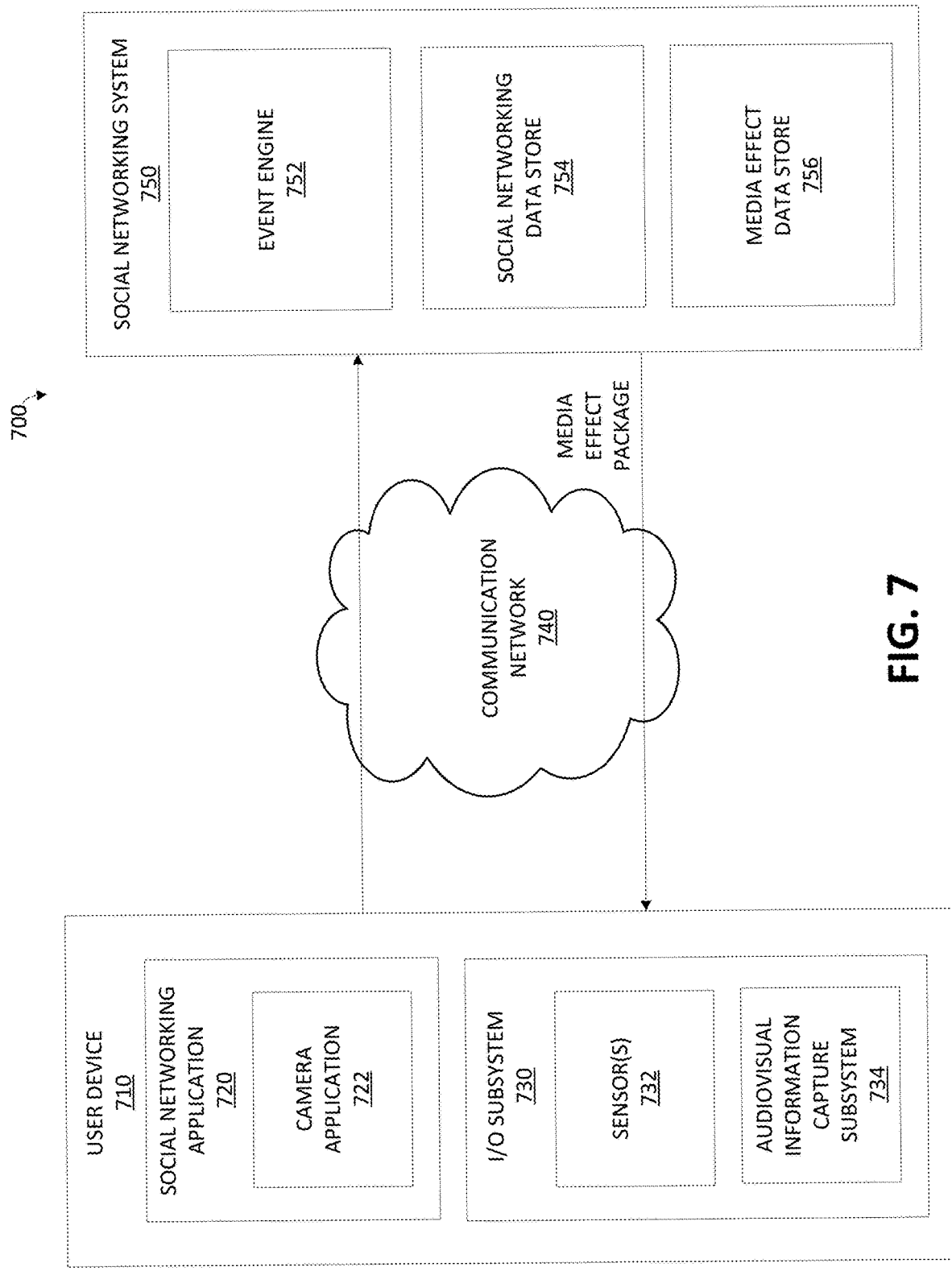
FIG. 7 is a simplified block diagram of a distributed environment.

FIG. 7 is a simplified block diagram of a distributed environment 700 that may implement one or more exemplary embodiments described herein. Distributed environment 700 includes one or more devices (e.g., user device 710) communicatively coupled with a social networking system 750 via communication network 740. Communication network 740 facilitates communications between the various systems depicted in FIG. 7. Communication network 740 may be of various types and may include one or more communication networks. Examples of the communication network 740 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication network 740 may include any infrastructure that facilitates communications between the various systems depicted in FIG. 7.

Distributed environment 700 depicted in FIG. 7 is merely an example and is not intended to unduly limit the scope of inventive embodiments recited in the claims. One of ordinary skill in the art would recognize many possible variations, alternatives, and modifications. For example, in some implementations, distributed environment 700 may have more or fewer systems than those shown in FIG. 7, may combine two or more systems, or may have a different configuration or arrangement of systems. Further, in some alternative embodiments, all the processing described herein may be performed by a single system. For example, in certain embodiments, the processing may be performed entirely by user device 710 or entirely by social networking system 750.

A user may use user device 710 to interact with one or more applications executed by user device 710 (e.g., a social networking application 720) and to communicate with other systems such as social networking system 750. Examples of user device 710 include a mobile device (e.g., an iPhone™ device, iPad™ device), a desktop computer, a laptop computer, or other computing device. While only one user device 710 is depicted in FIG. 7 for purposes of simplicity, this is not intended to be limiting. A typical distributed environment generally includes multiple users using multiple user devices, each configured to execute one or more applications and having the ability to communicate with social networking system 750 or other systems within the distributed environment.

User device 710 may include multiple subsystems, such as input and/or output (I/O) subsystem 730 depicted in FIG. 7. I/O subsystem 730 may include components for inputting and/or outputting data to or from user device 710. User device 710 may include one or more input device or mechanisms for inputting information to user device 710. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices.

User device 710 may include one or more output devices or mechanisms for outputting information from user device 710. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

As shown in FIG. 7, I/O subsystem 730 may include sensors 732, which may include sensors such as a Global Positioning System (GPS) sensor, an accelerometer, a thermometer, an altimeter, or other sensors.

As shown in FIG. 7, I/O subsystem 730 may include audiovisual information capture subsystem 734 for capturing audio and/or visual information. Audiovisual information capture subsystem 734 may include, for example, one or more cameras for capturing images or video information, one or more microphones for capturing audio information, or the like.

One or more applications may be installed on user device 710 and may be executed by user device 710. As shown in FIG. 7, these applications may include a social networking application 720 and a camera application 722. In the example depicted in FIG. 7, camera application 722 is a subsystem-application of social networking application 720. However this is not intended to be limiting; in some other embodiments, camera application 722 may be separate from social networking application 720 (e.g., a separate application executing on user device 710). While only two applications are depicted in FIG. 7 for user device 710 for purposes of simplicity, this is not intended to be limiting. A typical user device may execute more than two applications.

Camera application 722 is an example of an audiovisual application executed by user device 710 that may receive and output audiovisual information captured by one or more components of audiovisual information capture subsystem 734. For example, camera application 722, when executed, may output audiovisual captured by one or more cameras or microphones of user device 710.

In certain embodiments, social networking system 750 provides a social networking forum in which multiple users may interact and communicate with each other. Social networking system 750 may comprise multiple computing systems. Social networking system 750 may perform the server-side operations that facilitate the social networking forum and social networking application 720 may represent the client or user-device side application that users may interact with. For example, social networking system 750 may receive data from user device 710 (e.g., from social networking application 720), such as audiovisual content, sensor inputs, or other data from user device 710. Similarly, social networking system 750 may send data to user device 710 (e.g., to social networking application 720), such as a media effect package.

In the embodiment depicted in FIG. 7, social networking system 750 includes an event engine 752 that is configured to perform media effects-related processing functions described in this disclosure. Social networking system 750 may also store social networking data related to users of social networking system 750 in a social networking data store 754. Social networking system 750 may also store media effect packages for various media effects in a media effect data store 756. While FIG. 7 illustrates each of these components included in social networking system 750, it should be recognized that one or more of the components may be remote from social networking system 750. For example, media effect data store 756 may be on a remote network and/or server as relative to social networking system 750.

Event engine 752 may receive data that includes identification of an event. The data may be sent to the event engine 752, for example, when a user navigates to a web page for the event. For another example, the data may be sent to the event engine 752 when the social networking system 750 determines to send a notification to the user based on social networking data stored by the social networking system 750. In other examples, the data may include an identification of a particular media effect, rather than an identification of the event.

Event engine 752 may also receive audiovisual content from user device 710. Based on the audiovisual content (or data accompanying the audiovisual content), the event engine 752 may identify the event. For example, if an item may be identified based on the audiovisual content (e.g., a grill is included in the audiovisual content), the event (and/or a condition for the event) may be based on the identified item.

In some examples, in addition to an identification of the user, social networking system 750 may identify a location of user device 710 (e.g., through information stored by social networking system 750 regarding user device 710 and/or social networking application 720 or through data sent from social networking application 720, such as GPS data). In one illustrative example, social networking system 750 may identify that a particular user is inside of a museum and provide a media effect for the museum (which in this case is an event) to camera application 722.

In some examples, social networking system 750 might not receive audiovisual content or data that includes an identification of an event from user device 710. Instead, social networking system 750 may determine to send event-related content to user device 710 based on data stored by social networking system 750. For example, social networking system 750 may access a user profile for a user. The user profile may indicate that it is the user's birthday. In response to determining it is the user's birthday, the event engine 752 may receive information indicating that notifications are going to be sent to friends of the user.

After identifying an event, a media effect associated with event may be identified by the event engine 752. The media effect may be implemented by a media effect package. The media effect package may be sent to the user device 710 when it is determined that the user device 710 satisfied a set of one or more conditions associated with the media effect. In other examples, the media effect package may be sent to the user device 710 in response to a user-selectable option (which may be sent to the user device 710 for display in response to the user device 710 satisfying the set of one or more conditions) being selected by the user.

The media effect package may then be received by user device 710 and be applied to audiovisual content being presented by user device 710. In some examples, the audiovisual content being presented by user device 710 might not be stored by user device 710, but rather be in camera mode where the audiovisual content is being received by user device 710 from audiovisual information capture subsystem 734. In such an example, a user may cause a portion of modified audiovisual content (audiovisual content that is modified based on the media effect package) to be stored by user device 710.

Social networking system 750 may be associated with one or more computing devices for a social network, including a plurality of users, and providing users of the social network with the ability to communicate and interact with other users of the social network. In some instances, the social network may be represented by a graph (e.g., a data structure including edges and nodes). Other data structures may also be used to represent the social network, including but not limited to, databases, objects, classes, meta elements, files, or any other data structure. Social networking system 750 may be administered, managed, or controlled by an operator. The operator of social networking system 750 may be a human being, an automated application, or a series of applications for managing content, regulating policies, and collecting usage metrics within social networking system 750. Any type of operator may be used.

Users may join social networking system 750 and then add connections to any number of other users of social networking system 750 to whom they desire to be connected. As used herein, the term "friend" refers to any other user of social networking system 750 to whom a user has formed a connection, association, or relationship via social networking system 750. For example, in an embodiment, if users in social networking system 750 are represented as nodes in the social graph, the term "friend" may refer to an edge formed between and directly connecting two user nodes.

Connections may be added explicitly by a user or may be automatically created by social networking system 750 based on common characteristics of the users (e.g., users who are alumni of the same educational institution). For example, a first user specifically selects a particular other user to be a friend. Connections in social networking system 750 are usually in both directions, but need not be, so the terms "user" and "friend" depend on the frame of reference. Connections between users of social networking system 750 are usually bilateral ("two-way"), or "mutual," but connections may also be unilateral, or "one-way." For example, if Bob and Joe are both users of social networking system 750 and connected to each other, Bob and Joe are each other's connections. If, on the other hand, Bob wishes to connect to Joe to view data communicated to social networking system 750 by Joe, but Joe does not wish to form a mutual connection, a unilateral connection may be established. The connection between users may be a direct connection; however, some embodiments of social networking system 750 allow the connection to be indirect via one or more levels of connections or degrees of separation.

In addition to establishing and maintaining connections between users and allowing interactions between users, social networking system 750 provides users with the ability to take actions on various types of items supported by social networking system 750. These items may include groups or networks (e.g., social networks of people, entities, and concepts) to which users of social networking system 750 may belong, events or calendar entries in which a user might be interested, computer-based applications that a user may use via social networking system 750, transactions that allow users to buy or sell items via services provided by or through social networking system 750, and interactions with advertisements that a user may perform on or off social networking system 750. These are just a few examples of the items upon which a user may act on social networking system 750, and many others are possible. A user may interact with anything that is capable of being represented in social networking system 750 or coupled to social networking system 750 via communication network 740.

Social networking system 750 may be also capable of linking a variety of entities. For example, social networking system 750 may enable users to interact with each other as well as external systems or other entities through an API, a web service, or other communication channels. Social networking system 750 may generate and maintain a "social graph" including multiple nodes, each interconnected by one or more edges. Each node in the social graph may represent an entity that may act on another node and/or that may be acted on by another node. The social graph may include various types of nodes. Examples of types of nodes include users, non-person entities, content items, web pages, groups, activities, messages, concepts, and any other things that may be represented by an object in social networking system 750. An edge between two nodes in the social graph may represent a particular kind of connection, or association, between the two nodes, which may result from node relationships or from an action that was performed by one of the nodes on the other node. In some cases, the edges between nodes may be weighted. The weight of an edge may represent an attribute associated with the edge, such as a strength of the connection or association between nodes. Different types of edges may be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, social networking system 750 modifies edges connecting the various nodes to reflect the relationships and interactions.

Social networking system 750 also includes user-generated content, which enhances a user's interactions with social networking system 750. User-generated content may include anything a user may add, upload, send, or "post" to social networking system 750. For example, a user communicates posts to social networking system 750 from user device 710. Posts may include data such as status updates or other textual data, location information, images such as photos, videos, links, music or other similar data and/or media. Content may also be added to social networking system 750 by a third party. Content "items" are represented as objects in social networking system 750. In this way, users of social networking system 750 are encouraged to communicate with each other by posting text and content items of various types of media through various communication channels. Such communication increases the interaction of users with each other and increases the frequency with which users interact with social networking system 750.

Social networking system 750 may include a web server, an API request server, a user profile store, a connection store, an action logger, an activity log, an authorization server, or any combination thereof. In some embodiments, social networking system 750 may include additional, fewer, or different components for various applications. Other components, such as network interfaces, security mechanisms, load balancers, failover servers, management and network operations consoles, and the like are not shown so as to not obscure the details of the system.

The user profile store, which may be included in social networking data store 754, may maintain information about user accounts, including biographic, demographic, and other types of descriptive information, such as work experience, educational history, hobbies or preferences, location, and the like that has been declared by users or inferred by social networking system 750. This information is stored in the user profile store such that each user is uniquely identified. Social networking system 750 also stores data describing one or more connections between different users in the connection store. The connection information may indicate users who have similar or common work experience, group memberships, hobbies, or educational history. Additionally, social networking system 750 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in social networking system 750, such as non-person entities, buckets, cluster centers, images, interests, pages, external systems, concepts, and the like are also stored in the connection store.

Social networking system 750 may maintain data about objects with which a user may interact. To maintain this data, the user profile store and the connection store may store instances of the corresponding type of objects maintained by social networking system 750. Each object type has information fields that are suitable for storing information appropriate to the type of object. For example, the user profile store contains data structures with fields suitable for describing a user's account and information related to a user's account. When a new object of a particular type is created, social networking system 750 initializes a new data structure of the corresponding type, assigns a unique object identifier to it, and begins to add data to the object as needed. This might occur, for example, when a user becomes a user of social networking system 750, social networking system 750 generates a new instance of a user profile in the user profile store, assigns a unique identifier to the user account, and begins to populate the fields of the user account with information provided by the user.

The connection store includes data structures suitable for describing a user's connections to other users, connections to external systems or connections to other entities. The connection store may also associate a connection type with a user's connections, which may be used in conjunction with the user's privacy setting to regulate access to information about the user. In an embodiment, the user profile store and the connection store may be implemented as a federated database.

Data stored in the connection store, the user profile store, and the activity log enables social networking system 750 to generate the social graph that uses nodes to identify various objects and edges connecting nodes to identify relationships between different objects. For example, if a first user establishes a connection with a second user in social networking system 750, user accounts of the first user and the second user from the user profile store may act as nodes in the social graph. The connection between the first user and the second user stored by the connection store is an edge between the nodes associated with the first user and the second user. Continuing this example, the second user may then send the first user a message within social networking system 750. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by social networking system 750 (or, alternatively, in an image maintained by another system outside of social networking system 750). The image may itself be represented as a node in social networking system 750. This tagging action may create edges between the first user and the second user as well as create an edge between each of the users and the image, which is also a node in the social graph. In yet another example, if a user confirms attending an event, the user and the event are nodes obtained from the user profile store, where the attendance of the event is an edge between the nodes that may be retrieved from the activity log. By generating and maintaining the social graph, social networking system 750 includes data describing many different types of objects and the interactions and connections among those objects, providing a rich source of socially relevant information.

The web server links social networking system 750 to one or more user devices (e.g., user device 710) via communication network 740. The web server serves web pages, as well as other web-related content, such as Java, JavaScript, Flash, WL, and so forth. The web server may include a mail server or other messaging functionality for receiving and routing messages between social networking system 750 and one or more user devices (e.g., user device 710). The messages may be instant messages, queued messages (e.g., email), text and SMS messages, or any other suitable messaging format.

The API request server allows one or more external systems (e.g., user device 710) to call access information from social networking system 750 by calling one or more API functions. The API request server may also allow external systems to send information to social networking system 750 by calling APIs. User device 710, in one embodiment, may send an API request to social networking system 750 via communication network 740, and the API request server receives the API request. The API request server processes the request by calling an API associated with the API request to generate an appropriate response, which the API request server communicates to user device 710 via communication network 740. For example, responsive to an API request, the API request server collects data associated with a user and communicates the collected data to user device 710.

The action logger is capable of receiving communications from the web server about user actions on and/or off social networking system 750. The action logger populates the activity log with information about user actions, enabling social networking system 750 to discover various actions taken by its users within social networking system 750 and outside of social networking system 750. Any action that a particular user takes with respect to another node on social networking system 750 may be associated with each user's account, through information maintained in the activity log or in a similar database or other data repository. Examples of actions taken by a user within social networking system 750 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within social networking system 750, the action is recorded in the activity log. In one embodiment, social networking system 750 maintains the activity log as a database of entries. When an action is taken within social networking system 750, an entry for the action is added to the activity log. The activity log may be referred to as an action log.

The authorization server enforces one or more privacy settings of the users of social networking system 750. A privacy setting of a user determines how particular information associated with a user may be shared. The privacy setting comprises the specification of particular information associated with a user and the specification of the entity or entities with whom the information may be shared. Examples of entities with which information may be shared may include other users, applications, external systems, or any entity that may potentially access the information. The information that may be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that may access particular information may also be specified at various levels of granularity. Various sets of entities with which information may be shared may include, for example, all friends of the user, all friends of friends, all applications, or all external systems. One embodiment allows the specification of the set of entities to comprise an enumeration of entities. For example, the user may provide a list of external systems that are allowed to access certain information. Another embodiment allows the specification to comprise a set of entities along with exceptions that are not allowed to access the information. For example, a user may allow all external systems to access the user's work information, but specify a list of external systems that are not allowed to access the work information. Certain embodiments call the list of exceptions that are not allowed to access certain information a "block list." External systems belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server contains logic to determine if certain information associated with a user may be accessed by a user's friends, external systems, and/or other applications and entities.

For purposes of illustration, distributed environment 700 includes a single user device 710. However, in other embodiments, distributed environment 700 may include more user devices 710. In certain embodiments, social networking system 750 is operated by a social network provider. In various embodiments, however, social networking system 750 may provide social networking services to users (or members) of social networking system 750. In this sense, social networking system 750 provides a platform or backbone, which other systems may use to provide social networking services and functionalities to users across communication network 740.

Figure 8:
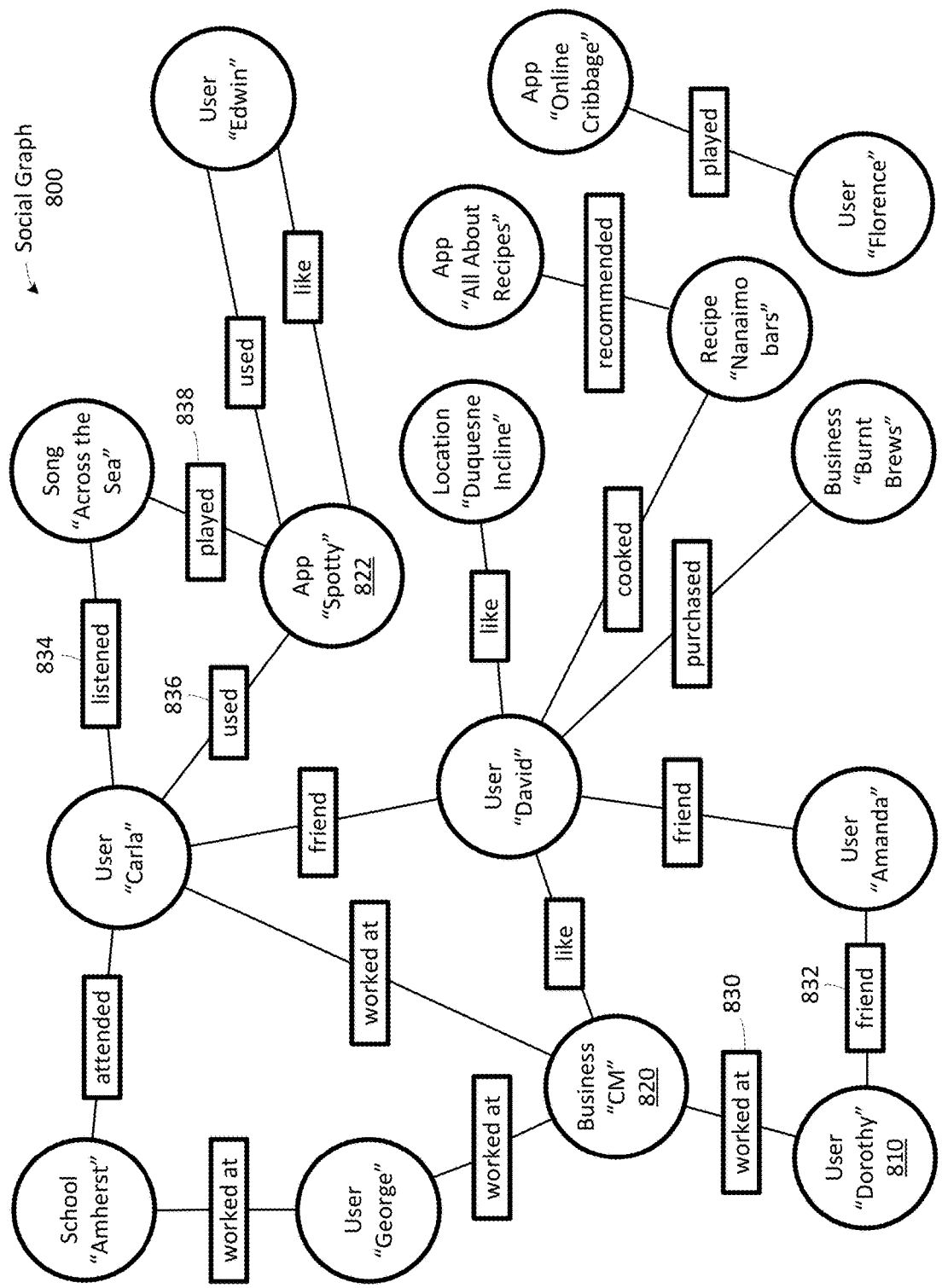
FIG. 8 illustrates an example of a social graph.

FIG. 8 illustrates an example of a social graph 800 according to certain embodiments. In exemplary embodiments, a social networking system (e.g., social networking system 750) may store one or more social graphs in one or more data stores as a social graph data structure.

Social graph 800 may include multiple nodes, such as user node 810 and concept node 820. Social graph 800 may further include edges between nodes, such as edge 830 connecting user node 810 and concept node 820. The nodes and edges of social graph 800 may be stored as data objects, for example, in a data store (such as a social-graph database). Such a data store may include one or more searchable or queryable indexes of nodes or edges of social graph 800.

The social graph 800 may be accessed by the social networking system, client devices (e.g., user device 710), or any other system or device for suitable applications.

User node 810 may correspond to a user of the social networking system. A user may be an individual (human user), an entity (e.g., an enterprise, business, or third-party application), or a group (e.g., of individuals or entities) that interacts or communicates with or over the social networking system. In exemplary embodiments, when a user registers for an account with the social networking system, the social networking system may create user node 810 corresponding to the user, and store user node 810 in one or more data stores. Users and user nodes described herein may, where appropriate, refer to registered users and user nodes associated with registered users. In addition or as an alternative, users and user nodes described herein may, where appropriate, refer to users that have not registered with the social networking system. In particular embodiments, user node 810 may be associated with information provided by a user or information gathered by various systems, including the social networking system. As an example and not by way of limitation, a user may provide their name, profile picture, contact information, birth date, sex, marital status, family status, employment, education background, preferences, interests, or other demographic information. In particular embodiments, user node 810 may be associated with one or more data objects corresponding to information associated with a user. In particular embodiments, user node 810 may correspond to one or more web pages. User node 810 may be associated with a unique user identifier for the user in the social networking system.

In particular embodiments, concept node 820 may correspond to a concept. As an example and not by way of limitation, a concept may correspond to a place (such as, for example, a movie theater, restaurant, landmark, or city), a website (such as, for example, a website associated with the social-network service or a third-party website associated with a web-application server), an entity (such as, for example, a person, business, group, sports team, or celebrity), a resource (such as, for example, an audio file, video file, digital photo, text file, structured document, or application) (which may be located within the social networking system or on an external server, such as a web-application server), real or intellectual property (such as, for example, a sculpture, painting, movie, game, song, idea, photograph, or written work), a game, an activity, an idea or theory, another suitable concept, or two or more such concepts. Concept node 820 may be associated with information of a concept provided by a user or information gathered by various systems, including the social networking system. As an example and not by way of limitation, information of a concept may include: a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, concept node 820 may be associated with one or more data objects corresponding to information associated with concept node 820. In particular embodiments, concept node 820 may correspond to one or more web pages.

In particular embodiments, node 810 in social graph 800 may represent or be represented by a web page (which may be referred to as a "profile page"). Profile pages may be hosted by or accessible to the social networking system. Profile pages may also be hosted on third-party websites associated with a third-party server. As an example and not by way of limitation, a profile page corresponding to a particular external web page may be the particular external web page and the profile page may correspond to concept node 820. Profile pages may be viewable by all or a selected subset of other users. As an example and not by way of limitation, user node 810 may have a corresponding user-profile page in which the corresponding user may add content, make declarations, or otherwise express himself or herself. A business page may comprise a user-profile page for a commerce entity. As another example and not by way of limitation, concept node 820 may have a corresponding concept-profile page in which one or more users may add content, make declarations, or express themselves, particularly in relation to the concept corresponding to concept node 820.

In particular embodiments, concept node 820 may represent a third-party web page or resource hosted by a third-party system. The third-party web page or resource may include, among other elements, content, a selectable or other icon, or other inter-actable object (which may be implemented, for example, in JavaScript, AJAX, or PHP codes) representing an action or activity. As an example and not by way of limitation, a third-party web page may include a selectable icon such as "like," "check in," "eat," "recommend," or another suitable action or activity. A user viewing the third-party web page may perform an action by selecting one of the icons (e.g., "eat"), causing a client system to send to the social networking system a message indicating the user's action. In response to the message, the social networking system may create an edge (e.g., an "eat" edge) between user node 810 (corresponding to the user) and concept node 820 (corresponding to the third-party web page or resource) and store edge 830 in one or more data stores.

In particular embodiments, a pair of nodes in social graph 800 may be connected to each other by one or more edges. Edge 830 connecting a pair of nodes may represent a relationship between the pair of nodes. In particular embodiments, edge 830 may include or represent one or more data objects or attributes corresponding to the relationship between a pair of nodes. As an example and not by way of limitation, a first user may indicate that a second user is a "friend" of the first user. In response to this indication, the social networking system may send a "friend request" to the second user. If the second user confirms the "friend request," the social networking system may create an edge connecting the first user's user node to the second user's user node in social graph 800 and store the edge as social-graph information in one or more data stores. In the example of FIG. 8, social graph 800 includes edge 832 indicating a friend relation between user nodes of user "Amanda" and user "Dorothy." Although this disclosure describes or illustrates particular edges with particular attributes connecting particular user nodes, this disclosure contemplates any suitable edges with any suitable attributes connecting user nodes. As an example and not by way of limitation, an edge may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges.

In particular embodiments, edge 830 between user node 810 and concept node 820 may represent a particular action or activity performed by a user associated with user node 810 toward a concept associated with concept node 820. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to concept node 820 may include, for example, a selectable "check in" icon (such as, for example, a clickable "check in" icon) or a selectable "add to favorites" icon. Similarly, after a user clicks these icons, the social networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social networking system may create a "listened" edge 834 and a "used" edge 836 (as illustrated in FIG. 8) between user nodes corresponding to the user and concept nodes corresponding to the song and application to indicate that the user listened to the song and used the application. Moreover, the social networking system may create a "played" edge 838 (as illustrated in FIG. 8) between concept nodes corresponding to the song and the application to indicate that the particular song was played by the particular application. In this case, "played" edge 838 corresponds to an action performed by an external application (SPOTIFY) on an external audio file (the song "Across the Sea"). Although this disclosure describes particular edges with particular attributes connecting user nodes and concept nodes, this disclosure contemplates any suitable edges with any suitable attributes connecting user nodes and concept nodes. Moreover, although this disclosure describes edges between a user node and a concept node representing a single relationship, this disclosure contemplates edges between a user node and a concept node representing one or more relationships. As an example and not by way of limitation, an edge may represent both that a user likes and has used a particular concept. Alternatively, another edge may represent each type of relationship (or multiples of a single relationship) between a user node and a concept node (as illustrated in FIG. 8 between user node 812 for user "Edwin" and concept node 822 for "SPOTIFY").

In particular embodiments, the social networking system may create edge 830 between user node 810 and concept node 820 in social graph 800. As an example and not by way of limitation, a user viewing a concept-profile page (such as, for example, by using a web browser or a special-purpose application hosted by the user's client system) may indicate that he or she likes the concept represented by concept node 820 by clicking or selecting a "Like" icon, which may cause the user's client system to send to the social networking system a message indicating the user's liking of the concept associated with the concept-profile page. In response to the message, the social networking system may create an edge between users. In particular embodiments, the social networking system may create edge 830 between user node 810 and concept node 820 in social graph 800. As an example and not by way of limitation, a user viewing a concept-profile page (such as, for example, by using a web browser or a special-purpose application hosted by the user's client system) may indicate that he or she likes the concept represented by concept node 820 by clicking or selecting a "Like" icon, which may cause the user's client system to send to the social networking system a message indicating the user's liking of the concept associated with the concept-profile page. In response to the message, the social networking system may create an edge between users.

Social graph 800 may further comprise a plurality of product nodes. Product nodes may represent particular products that may be associated with a particular business. A business may provide a product catalog to a consumer-to-business service and the consumer-to-business service may therefore represent each of the products within the product in social graph 800 with each product being in a distinct product node. A product node may comprise information relating to the product, such as pricing information, descriptive information, manufacturer information, availability information, and other relevant information. For example, each of the items on a menu for a restaurant may be represented within social graph 800 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within social graph 800. The information for a product node may be manipulated by the social networking system as a product object that encapsulates information regarding the referenced product.

As such, social graph 800 may be used to infer shared interests, shared experiences, or other shared or common attributes of two or more users of the social networking system. For instance, two or more users each having an edge to a common business, product, media item, institution, or other entity represented in social graph 800 may indicate a shared relationship with that entity, which may be used to suggest customization of a use of the social networking system, including a messaging system, for one or more users.

Some embodiments described herein make use of social networking data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well.

Figure 9:
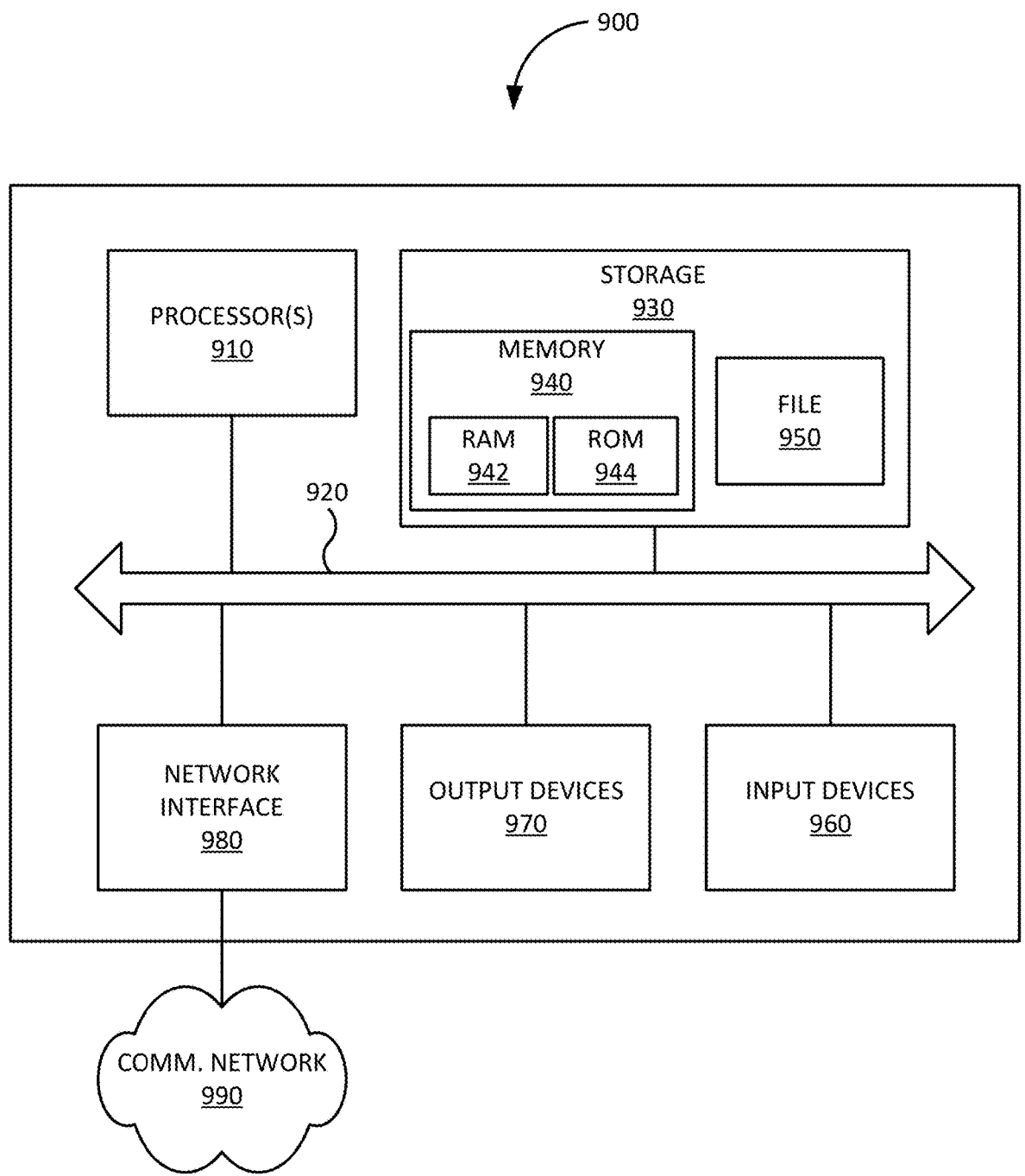
FIG. 9 illustrates an example of a block diagram of a computing system.

FIG. 9 illustrates an example of a block diagram of a computing system 900. The computing system shown in FIG. 9 may be used to implement user device 710, social networking system 750, or any other computing device described herein. In this example, computing system 900 includes input devices 960, output devices 970, a network interface 980, and the like. In the present example, input devices 960 are typically embodied as a computer mouse, a trackball, a track pad, a joystick, wireless remote, drawing tablet, voice command system, eye tracking system, and the like. Input devices 960 typically allow a user to select objects, icons, text and the like that appear on a monitor via a command such as a click of a button or the like.

Examples of network interface 980 typically include an Ethernet card, a modem (telephone, satellite, cable, ISDN), (asynchronous) digital subscriber line (DSL) unit, FireWire interface, USB interface, and the like. For example, network interfaces 980 may be coupled to communication network 990, to a FireWire bus, or the like. In other embodiments, network interface 980 may be physically integrated on a motherboard of a computer, may be a software program, such as soft DSL, or the like.

In various examples, computing system 900 includes familiar computer components such as one or more processors 910, and memory storage 930, such as a memory 940 comprising random access memory (RAM) 942 and read-only-memory (ROM) 944, and file 950, and a system bus 920 interconnecting the above components.

RAM 942 is an example of a tangible medium configured to store data such as embodiments of the present disclosure, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various examples, computing system 900 may also include software that enables communications over a network such as the HTTP, TCP/IP, RTP/RTSP protocols, and the like. In alternative embodiments of the present disclosure, other communications software and transfer protocols may also be used, for example IPX, UDP or the like.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product containing computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:

determining, by a computing system, event-related content to be provided to a first user of a social networking system, wherein the event-related content comprises information about an event;

identifying, by the computing system, a media effect package created for the event;

determining, by the computing system, a set of one or more conditions defined for the media effect package, wherein the set of one or more conditions comprises at least one of a temporal condition, a location condition, or a condition relating to information in a user profile stored by the social networking system for the first user;

determining, by the computing system based on information that is received from a first device associated with the first user or the information in the user profile stored by the social networking system for the first user, that the set of one or more conditions is satisfied;

causing, by the computing system, the event-related content to be sent to the first device; and causing, by the computing system and in response to the determining that the set of one or more conditions is satisfied, media effect-related content to be sent to the first device, wherein the media effect-related content causes a first application executing on the first device to concurrently display on a display of the first device and via a user interface of the first application, a user-selectable option and the event- related content, and wherein selection of the user-selectable option causes the first device to invoke a second application that outputs one or more effects implemented by the media effect package, the one or more effects being output via a user interface of the second application and comprising at least one of an audio effect or a visual effect, wherein the second application receives the media effect package from the first device, wherein the second application uses the received media effect package to modify media content captured using at least one of a camera of the first device or a microphone of the first device, wherein the media content is captured after invoking the second application, and wherein the one or more effects are output as part of outputting the modified media content on the user interface of the second application.

2. The method of claim 1, wherein the event-related content is a web page related to the event.

3. The method of claim 1, wherein the event-related content is a notification related to the event.

4. The method of claim 1, wherein the media effect package includes a script that implements the one or more effects.

5. The method of claim 4, further comprising:
sending the script to the second application in response to receiving a request, the request being sent from the first device after selection of the user-selectable option, wherein the script is executed by the second application.

6. The method of claim 1, wherein the set of one or more conditions includes a condition related to a time associated with the event or a location associated with the event.

7. The method of claim 1, wherein the set of one or more conditions includes a condition related to social networking data stored by the social networking system in the user profile.

8. The method of claim 1, wherein the media effect package is created by a second user of the social networking system, the second user being different than the first user, and wherein the set of one or more conditions includes a condition defined by the second user.

9. The method of claim 1, wherein determining that the set of one or more conditions is satisfied comprises:
receiving, by the computing system, temporal or geographic information from the first device; and
determining that the set of one or more conditions is satisfied based on the temporal or geographic information received from the first device.

10. The method of claim 9, wherein the temporal or geographic information includes a location of the first device, wherein a first condition of the set of one or more conditions identifies a location related to the event, and wherein determining that the set of one or more conditions is satisfied includes determining that the location of the first device matches the location related to the event.

11. The method of claim 1, further comprising:
communicating, by the computing system, the modified media content to a device associated with a second user and in response to selection by the first user of a second user-selectable option, the second user-selectable option being displayed via a third user-interface provided by the first application or the second application.

12. A non-transitory computer-readable storage medium storing a plurality of instructions executable by one or more processors, wherein the plurality of instructions, when executed by the one or more processors, cause the one or more processors to:
determine event-related content to be provided to a first user of a social networking system, wherein the event-related content comprises information about an event;
identify a media effect package created for the event;
determine a set of one or more conditions defined for the media effect package, wherein the set of one or more conditions comprises at least one of a temporal condition, a location condition, or a condition relating to information in a user profile stored by the social networking system for the first user;
determine, based on information that is received from a first device associated with the first user or the information in the user profile stored by the social networking system for the first user, that the set of one or more conditions is satisfied;
send the event-related content to the first device; and
responsive to determining that the set of one or more conditions is satisfied, send media effect-related content to the first device, wherein the media effect-related content causes a first application executing on the first device to concurrently display on a display of the first device and via a user interface of the first application, a user-selectable option and the event-related content, and wherein selection of the user-selectable option causes the first device to invoke a second application that outputs one or more effects implemented by the media effect package, the one or more effects being output via a user interface of the second application and comprising at least one of an audio effect or a visual effect, wherein the second application receives the media effect package from the first device, wherein the second application uses the received media effect package to modify media content captured using at least one of a camera of the first device or a microphone of the first device, wherein the media content is captured after invoking the second application, and wherein the one or more effects are output as part of outputting the modified media content on the user interface of the second application.

13. The non-transitory computer-readable storage medium of claim 12, wherein the event-related content is a web page related to the event.

14. The non-transitory computer-readable storage medium of claim 12, wherein the event-related content is a notification related to the event.

15. The non-transitory computer-readable storage medium of claim 12, wherein the media effect package includes a script that implements the one or more effects, and wherein the plurality of instructions, when executed by the one or more processors, further cause the one or more processors to:
send the script to the second application in response to receiving a request, the request being sent from the first device after selection of the user-selectable option, wherein the script is executed by the second application.

16. The non-transitory computer-readable storage medium of claim 12, wherein the set of one or more conditions includes:
a condition related to a time associated with the event;
a condition related to a location associated with the event; or a condition related to social networking data stored by the social networking system in the user profile.

17. The non-transitory computer-readable storage medium of claim 12, wherein the media effect package is created by a second user of the social networking system, the second user being different than the first user, and wherein the set of one or more conditions includes a condition defined by the second user.

18. The non-transitory computer-readable storage medium of claim 12, wherein to determine that the set of one or more conditions is satisfied, the one or processors:
receive temporal or geographic information from the first device, wherein the temporal or geographic information includes a location of the first device; and
determine that the set of one or more conditions is satisfied based on the temporal or geographic information received from the first device, wherein a first condition of the set of one or more conditions identifies a location related to the event, and wherein to determine that the set of one or more conditions is satisfied, the one or more processors determine that the location of the first device matches the location related to the event.

19. A system comprising:
one or more processors; and
a non-transitory computer-readable storage medium including instructions that, when executed by the one or more processors, cause the one or more processors to:
determine event-related content to be provided to a first user of a social networking system, wherein the event-related content comprises information about an event;
identify a media effect package created for the event;
determine a set of one or more conditions defined for the media effect package, wherein the set of one or more conditions comprises at least one of a temporal condition, a location condition, or a condition relating to information in a user profile stored by the social network system for the first user;
determine, based on information that is received from a first device associated with the first user or the information in the user profile stored by the social networking system for the first user, that the set of one or more conditions is satisfied;
cause the event-related content to be sent to the first device; and
cause, in response to determining that the set of one or more conditions is satisfied, media effect-related content to be sent to the first device, wherein the media effect-related content causes a first application executing on the first device to concurrently display on a display of the first device and via a user interface of the first application, a user-selectable option and the event- related content, and wherein selection of the user-selectable option causes the first device to invoke a second application that outputs one or more effects implemented by the media effect package, the one or more effects being output via a user interface of the second application and comprising at least one of an audio effect or a visual effect, wherein the second application receives the media effect package from the first device, wherein the second application uses the received media effect package to modify media content captured using at least one of a camera of the first device or a microphone of the first device, wherein the media content is captured after invoking the second application, and wherein the one or more effects are output as part of outputting the modified media content on the user interface of the second application.

* * * * *